(12) United States Patent
Lee et al.

(10) Patent No.: US 10,209,560 B2
(45) Date of Patent: Feb. 19, 2019

(54) BACKLIGHT UNIT COMPRISING A QUANTUM DOT POWDER HAVING A FIRST QUANTUM DOT, A FIRST QUANTUM DOT, A SECOND QUANTUM DOT, A FIRST CHAIN MOLECULE, A SECOND CHAIN MOLECULE, AND A BEAD AND DISPLAY DEVICE INCLUDING THE SAME

(71) Applicant: GL VISION INC., Gangwon-do (KR)

(72) Inventors: Woo Sik Lee, Anyang-si (KR); Wang Gun Yu, Seoul (KR)

(73) Assignee: GL VISION INC., Gangwon-Do (KR)

(*) Notice: Subject to any disclaimer, the term of this patent is extended or adjusted under 35 U.S.C. 154(b) by 0 days.

(21) Appl. No.: 15/697,352

(22) Filed: Sep. 6, 2017

(65) Prior Publication Data
US 2019/0018283 A1    Jan. 17, 2019

(30) Foreign Application Priority Data

Jul. 17, 2017   (KR) .......................... 10-2017-0090591
Jul. 17, 2017   (KR) .......................... 10-2017-0090592
(Continued)

(51) Int. Cl.
*G02F 1/1335*   (2006.01)
*F21V 8/00*   (2006.01)
*G02F 1/1333*   (2006.01)

(52) U.S. Cl.
CPC ..... *G02F 1/133602* (2013.01); *G02B 6/0025* (2013.01); *G02B 6/0031* (2013.01); *G02F 1/133308* (2013.01); *G02F 1/133504* (2013.01)

(58) Field of Classification Search
CPC ...................... G02F 1/133602; G02B 6/0025
See application file for complete search history.

(56) References Cited

U.S. PATENT DOCUMENTS

2009/0001349 A1   1/2009  Kahen
2009/0034230 A1*  2/2009  Lim .................... G02B 6/0028
                                                              362/84
(Continued)

FOREIGN PATENT DOCUMENTS

JP         2010-532409 A    10/2010
KR   10-2012-0012642 A       2/2012
(Continued)

OTHER PUBLICATIONS

KR Notice of Allowance in application No. 10-2017-0090591 dated Aug. 31, 2018.

*Primary Examiner* — Paul Lee
(74) *Attorney, Agent, or Firm* — Maschoff Brennan

(57) ABSTRACT

The present application relates to a backlight unit and a display device including the same, and according to one aspect of the present application, there is provided a backlight unit including a light source, a light guide plate disposed at a side portion of the light source, and a light-modulating reflective film disposed below the light guide plate, wherein the light-modulating reflective film includes a first base film, a quantum dot film disposed to be in contact with a bottom of the first base film and including a quantum dot, a reflective film including a diffuse reflection material, and a second base film disposed to be in contact with a bottom of the reflective film, and the reflective film including a diffuse reflection material is disposed to be in contact with the quantum dot film.

11 Claims, 27 Drawing Sheets

(30) Foreign Application Priority Data

Jul. 17, 2017 (KR) .................. 10-2017-0090593
Jul. 17, 2017 (KR) .................. 10-2017-0090594

(56) References Cited

U.S. PATENT DOCUMENTS

| | | |
|---|---|---|
| 2012/0025239 A1 | 2/2012 | Kim et al. |
| 2014/0264172 A1* | 9/2014 | Daniels .............. H01L 33/06 |
| | | 252/301.6 S |
| 2014/0264196 A1* | 9/2014 | Werner .............. C23C 16/30 |
| | | 252/519.34 |
| 2015/0344776 A1* | 12/2015 | Bootman ............ C09K 11/025 |
| | | 252/301.36 |
| 2016/0005932 A1* | 1/2016 | Lee .................. C09K 11/02 |
| | | 257/98 |
| 2016/0097892 A1* | 4/2016 | Jeon ................. G02B 6/0031 |
| | | 349/62 |
| 2016/0272885 A1* | 9/2016 | Bai .................. C08K 5/00 |

FOREIGN PATENT DOCUMENTS

| | | |
|---|---|---|
| KR | 10-2012-0015582 A | 2/2012 |
| KR | 10-2017-0024745 A | 3/2017 |
| KR | 2017-0035688 A | 3/2017 |

* cited by examiner (a)

(b)

BACKLIGHT UNIT COMPRISING A QUANTUM DOT POWDER HAVING A FIRST QUANTUM DOT, A FIRST QUANTUM DOT, A SECOND QUANTUM DOT, A FIRST CHAIN MOLECULE, A SECOND CHAIN MOLECULE, AND A BEAD AND DISPLAY DEVICE INCLUDING THE SAME

CROSS-REFERENCE TO RELATED APPLICATION

This application claims priority to and the benefit of Korean Patent Application Nos. 10-2017-0090591, 10-2017-0090592, 10-2017-0090593 and 10-2017-0090594 filed on Jul. 17, 2017, the disclosure of which is incorporated herein by reference in its entirety.

BACKGROUND

1. Field of the Invention

The present application relates to a backlight unit and a display device including the same, and more particularly, to a backlight unit, that includes a quantum dot film disposed below a light guide plate, and a display device including the same.

2. Discussion of Related Art

A quantum dot is a semiconductor material having a crystalline structure of several nanometers and represents a characteristic between a bulk semiconductor and a discrete molecule of the same material. Because physical, chemical, and electrical characteristics of the quantum dot can be adjusted by changing a size in the same material due to the quantum confinement effect and a large surface-to-volume ratio, the quantum dot has gained great interest as a new method and material for adjusting a physical property.

The quantum dot is deposited in a resin in the form of a film and implemented as a quantum dot film to be used.

The quantum dot film may be included in a backlight unit and disposed in a display device such as a display or the like. To facilitate disposition of the backlight unit, demand for a backlight unit that is easy to be disposed in a display device is increasing nowadays.

The conventional quantum dot film has a problem in that optical efficiency of the quantum dot film decreases over time. Consequently, demand for a quantum dot film having improved phase stability and thermal stability to maintain optical efficiency at the time of realization even over time is increasing.

SUMMARY OF THE INVENTION

It is an aspect of the present application to provide a backlight unit that is easy to be disposed in a display device.

It is another aspect of the present application to provide a backlight unit that includes a quantum dot film with improved phase stability and thermal stability.

The aspects of the present application are not limited to the above-described aspects, and other unmentioned aspects should be clearly understood by one of ordinary skill in the art to which the present application pertains from the present specification and the accompanying drawings.

According to an aspect of the present application, there is provided a backlight unit that includes a light source, a light guide plate disposed at a side portion of the light source, and a light-modulating reflective film disposed below the light guide plate, wherein the light-modulating reflective film includes a first base film, a quantum dot film disposed to be in contact with a bottom of the first base film and including a quantum dot, a reflective film including a diffuse reflection material, and a second base film disposed to be in contact with a bottom of the reflective film, and the reflective film including a diffuse reflection material is disposed to be in contact with the quantum dot film.

According to another aspect of the present application, there is provided a display device that includes a bottom cover, a support main body coupled to the bottom cover, and a backlight unit disposed between the bottom cover and the support main body, and a backlight unit disposed above the support main body, wherein the backlight unit includes a light source, a light guide plate disposed at a side portion of the light source, and a light-modulating reflective film disposed below the light guide plate, wherein the light-modulating reflective film includes a first base film, a quantum dot film disposed to be in contact with a bottom of the first base film and including a quantum dot, a reflective film including a diffuse reflection material, and a second base film disposed to be in contact with a bottom of the reflective film, and the reflective film including a diffuse reflection material is disposed to be in contact with the quantum dot film.

The solutions of the present application are not limited to the above-described solutions, and other unmentioned solutions should be clearly understood by one of ordinary skill in the art to which the present application pertains from the present specification and the accompanying drawings.

BRIEF DESCRIPTION OF THE DRAWINGS

The above and other objects, features and advantages of the present application will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
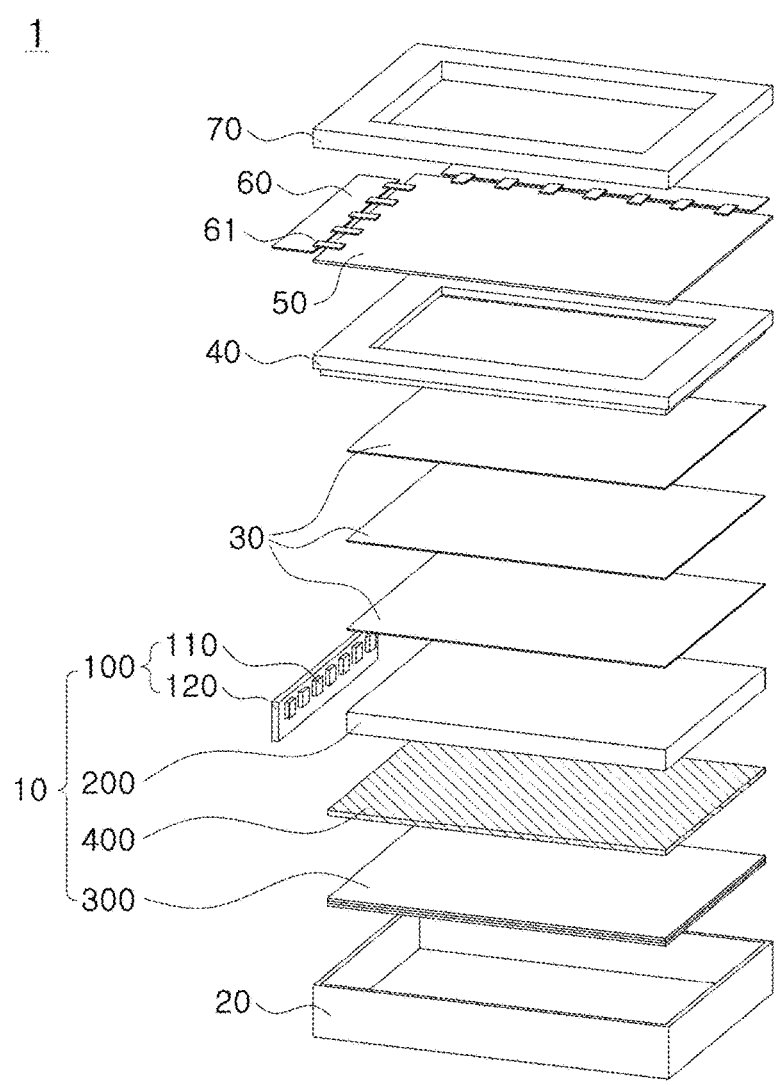
FIG. 1 is an exploded perspective view of a backlight unit and a display device including the same according to an embodiment of the present application.

Embodiments described in the present specification are for clearly describing the idea of the present invention to one of ordinary skill in the art to which the present invention pertains. Thus, the present invention is not limited by the embodiments described in the present specification, and the scope of the present invention should be construed as including modified examples that belong to the idea of the present invention.

The terms used in the present specification are selected from currently widely used general terms in consideration of functions in the present invention, but may vary according to the intentions or practices of one of ordinary skill in the art to which the present invention pertains or the advent of new technology. In contrast, when an applicant arbitrarily defines and uses specific terms, meanings of the terms will be described below. Accordingly, the terms used in the present specification should be interpreted on the basis of substantial meanings that the terms have and the contents throughout the present specification instead of simply the names of the terms.

The drawings attached to the present specification are for facilitating description of the present invention, and shapes illustrated in the drawings may be exaggerated as needed to assist understanding the present invention. Thus, the present invention is not limited by the drawings.

In the present specification, when detailed description of a known configuration or function related to the present invention is deemed to blur the gist of the present invention, detailed description thereof will be omitted as needed.

According to one aspect of the present application, there is provided a backlight unit including a light source, a light guide plate disposed at a side portion of the light source, and a light-modulating reflective film disposed below the light guide plate, wherein the light-modulating reflective film includes a first base film, a quantum dot film disposed to be in contact with a bottom of the first base film and including quantum dots, a reflective film including a diffuse reflection material, and a second base film disposed to be in contact with a bottom of the reflective film, and the reflective film including a diffuse reflection material is disposed to be in contact with the quantum dot film.

The first base film and the second base film may include polyethylene terephthalate (PET).

An air gap may be formed between the first base film and the light guide plate, and an upper surface of the first base film may be exposed to the air gap.

The upper surface of the first base film may be in contact with a lower surface of the light guide plate, and a lower surface of the first base film may be in contact with the quantum dot film.

Light output from the light source may be applied to the light guide plate, a first light may be output from the light guide plate, wherein the first light is transmitted through the first base film and applied to the quantum dot film, and a second light may be output from the quantum dot film in a direction toward the light guide plate, wherein the second light is transmitted through the first base film.

A third light may be output from the quantum dot film and applied to the reflective film, and a fourth light may be output from the reflective film.

Backlight may be output from the light guide plate on the basis of the fourth light.

The quantum dot film may include organic members, inorganic members disposed to be in contact with the organic members, and a quantum dot powder adjacent to the inorganic members, wherein the quantum dot powder includes a plurality of the quantum dots each including a quantum core, a quantum shell surrounding the quantum core, and a ligand formed on a surface of the quantum shell, chain molecules each including one end and the other end attached to the quantum dots, and a bead located between the other ends of a plurality of the chain molecules, and the inorganic member is in contact with the chain molecules.

The quantum dots may include a first quantum dot and a second quantum dot, wherein the first quantum dot and the second quantum dot are disposed at positions adjacent to each other, and the chain molecules may include a first chain molecule and a second chain molecule, wherein the first chain molecule is attached to the first quantum dot, the second chain molecule is attached to the second quantum dot, and the bead is located between the other end of the first chain molecule and the other end of the second chain molecule.

The organic members may include a first organic member and a second organic member, and the inorganic members may include a first inorganic member and a second inorganic member, wherein an organic functional group of the first organic member is contact with the first inorganic member, an organic functional group of the second organic member is in contact with the second inorganic member, the first inorganic member is in contact with the first chain molecule, and the second inorganic member is in contact with the first chain molecule.

At least one of the organic members, the inorganic members, the quantum dots, the chain molecules, and the bead is in contact with the reflective film.

According to another aspect of the present application, there is provided a display device including a bottom cover, a support main body coupled to the bottom cover, a backlight unit disposed between the bottom cover and the support main body, and a backlight unit disposed above the support main body, wherein the backlight unit includes a light source, a light guide plate disposed at a side portion of the light source, and a light-modulating reflective film disposed below the light guide plate, wherein the light-modulating reflective film includes a first base film, a quantum dot film disposed to be in contact with a bottom of the first base film and including quantum dots, a reflective film including a diffuse reflection material, and a second base film disposed to be in contact with a bottom of the reflective film, and the reflective film including a diffuse reflection material is disposed to be in contact with the quantum dot film.

In the present specification, light may be interpreted as electromagnetic waves in all frequency bands. That is, light in the present specification may be electromagnetic waves in a visible light frequency band (visible light (VL)), electromagnetic waves in an ultraviolet frequency band (ultraviolet (UV) light), or electromagnetic waves in an infrared frequency band (infrared (IR) light). Alternatively, light in the present specification may be electromagnetic waves having a wavelength band other than the above-mentioned frequency bands.

In the present specification, when it is said that one element is "attached" to another element, it should be interpreted that an overall region (entire region) or a partial region (part) of one element is in contact with another element. Also, being "attached" should be interpreted in a broad sense including being in contact as well as being in contact and firmly fixed. That is, when one element is attached to another element, the one element may be separated from the other element due to a predetermined external force.

In the present specification, when one element extends in one direction, an "end" of the element may be defined as a portion at an end of the element in the direction.

In the present specification, unless particularly mentioned otherwise, optical efficiency should be interpreted in a broad sense including an amount of emitted photons (or intensity of light) per an amount of photons (or intensity of light) applied to quantum dots or light scattering property in which light is detected at a plurality of positions around the quantum dots, and intensity of light in a specific wavelength band when light output from the quantum dots is measured.

In the present specification, although terms such as first, second, third, and fourth are used to describe an element of a quantum dot film light source unit, it is evident that each element should not be limited by the terms. That is, the terms first, second, third, and fourth below should be interpreted as distinguishing a plurality of elements.

In the present specification, predetermined light may be applied to one element, and the element may output predetermined light. In this case, the former predetermined light may be different from the latter predetermined light. Each predetermined light may have different characteristics such as a path, a wavelength, and a frequency. Accordingly, when a first light is applied from one element to another element, and the other element outputs a second light on the basis of the received first light, the first light and the second light may be different from each other. However, hereinafter, to facilitate description, the first light and the second light will be referred to by the same term "light" unless particularly mentioned otherwise.

Hereinafter, a backlight unit and a display device including the backlight unit according to an embodiment of the present application will be described.

First Embodiment

Hereinafter, a first embodiment will be described.

FIG. 1 is an exploded perspective view of a backlight unit 10 and a display device 1 including the same according to an embodiment of the present application.

Referring to FIG. 1, the display device 1 includes the backlight unit 10, a bottom cover 20, optical sheets 30, a support main body 40, a display panel 50, a printed substrate 60, a flexible printed circuit (FPC,61), and a top cover 70, the backlight unit 10 may include a light unit 100, a light guide plate 200, a quantum dot film 400, and a reflective plate 300, and the light unit 100 may include a light source 110 and a light driver 120. However, elements illustrated in FIG. 1 are not essential elements, and the display device 1 having elements more or less than those illustrated in FIG. 1 may be implemented.

The backlight unit 10 may emit backlight. The backlight may be implemented by the backlight unit 10. The backlight may be defined as light emitted upward, toward the optical sheets 30, and toward the display panel 50 from the light guide plate 200 of the backlight unit 10.

The bottom cover 20 may support the backlight unit 10.

The optical sheets 30 may transmit the received backlight to the display panel 50.

The support main body 40 may be coupled to the bottom cover 20 and support the backlight unit 10 and the optical sheets 30.

The display panel 50 may implement the backlight using light having predetermined color.

The printed substrate 60 may generate a driving signal for driving the display panel 50.

The FPC 61 may receive the driving signal and transmit the driving signal to the display panel 50.

The top cover 70 may cover the display panel 50.

Hereinafter, each of the above elements will be described in detail.

First, the bottom cover 20 will be described.

The bottom cover 20 may have a predetermined outer shape. The bottom cover 20 may have a shape in which an upper surface is open and a bottom surface is exposed.

The bottom cover 20 may support and accommodate each of the elements of the display device 1. The bottom cover 20 may support each of the elements of the display device 1 by the exposed bottom surface. The backlight unit 10 may be in contact with and supported by the exposed bottom surface of the bottom cover 20.

The bottom cover 20 may be coupled to a predetermined element. The bottom cover 20 may be coupled to the support main body 40. Elements of the display device 1 may be included in a space defined between the bottom cover 20 and the support main body 40 coupled to each other. The backlight unit 10 and the optical sheets 30 may be included in the space.

Hereinafter, the backlight unit 10 will be described.

The backlight unit 10 may generate backlight.

Hereinafter, each of the elements of the backlight unit 10 will be described.

First, the light unit 100 will be described.

The light unit 100 may provide light to each of the elements of the backlight unit 10. The light may be light in a blue wavelength band.

The light source 110 of the light unit 100 may generate and emit light. The light source 110 may emit the light toward the light guide plate 200. The light source 110 may apply the light to the light guide plate 200. The light source 110 may include a visible light emitting diode (LED) or an infrared LED.

The light driver 120 of the light unit 100 may apply a predetermined control signal to the light source 110 so that the light source 110 can emit light.

The light unit 100 may be disposed at a side portion of the light guide plate 200. The light unit 100 may be disposed to be adjacent to a part of the side portion of the light guide plate 200 or disposed to be adjacent to the entire region of the side portion of the light guide plate 200.

Hereinafter, the light guide plate 200 will be described.

The light guide plate 200 may change a path of received light. The changing the path of the light may be on the basis of scattering, diffusion, or the like by the light guide plate 200.

The light guide plate 200 may receive the light and allow predetermined light to be output in various directions. The light guide plate 200 may receive the light and scatter the light in various directions. The various directions may include downward such as a direction toward the quantum dot film 400, a direction toward the reflective plate 300, and a direction toward the bottom cover 20 and upward such as a direction toward the optical sheets 30, a direction toward the support main body 40, a direction toward the display panel 50, and a direction toward the top cover 70.

The light guide plate 200 may scatter light applied to each region of the light guide plate 200 in various directions. The light guide plate 200 may scatter the light in a first direction in a first region and scatter the light in a second direction in a second region. The light guide plate 200 may convert the received light into area light and emit the light on the basis of the scattering.

The light guide plate 200 may receive the light and output the light in a specific direction. The specific direction may be downward such as the direction toward the quantum dot film 400, the direction toward the reflective plate 300, or the direction toward the bottom cover 20. The light guide plate 200 may allow the path of the light to head downward. The light guide plate 200 may scatter the light downward or allow the light to be reflected downward from a specific region of the light guide plate 200 and output. The specific region may be a region of an upper surface of the light guide plate 200.

The light guide plate 200 may be implemented using a material that allows changing the path of the light. The material may include polymethyl methacrylate (PMMA)-based resin, olefin-based resin (COC), or the like.

A predetermined optical pattern may be formed on the light guide plate 200. The optical pattern may be defined as a pattern formed on the light guide plate 200 using a predetermined processing method to improve luminance of the display device 1.

Hereinafter, the quantum dot film 400 will be described.

The quantum dot film 400 may receive light from the light guide plate 200. The quantum dot film 400 may receive light output downward from the light guide plate 200.

The quantum dot film 400 may modulate light. The quantum dot film 400 may output modulated light. The modulated light may be defined as light having a different optical characteristic from light applied to the quantum dot film 400. The optical characteristic may be intensity for each wavelength. The modulated light may be white light.

The quantum dot film 400 may generate the modulated light on the basis of quantum dots included in the quantum dot film 400. The quantum dots may receive light and output light in a specific wavelength band.

The quantum dot film 400 may output the modulated light. The modulated light may be output downward such as a direction from the quantum dot film 400 to the reflective plate 300. Alternatively, the modulated light may be output upward such as a direction from the quantum dot film 400 to the light guide plate 200.

Hereinafter, the modulated light will be referred to as "light" and described unless particularly mentioned otherwise.

Hereinafter, the reflective plate 300 will be described.

The reflective plate 300 may reflect received light.

The reflective plate 300 may receive light from the quantum dot film 400. The reflective plate 300 may receive light output downward from the quantum dot film 400.

The reflective plate 300 may reflect light incident on the reflective plate 300 so that the light is output upward such as the direction toward the quantum dot film 400, the direction toward the light guide plate 200, and the direction toward the display panel 50.

The backlight unit 10 has been described above.

Hereinafter, the optical sheets 30 will be described.

The optical sheets 30 may diffuse and condense received light and transmit the received light to the display panel 50. The light may be light or backlight.

The optical sheets 30 may include a light diffusion film, a prism sheet, a diffusion sheet, or the like.

Hereinafter, the support main body 40 will be described.

The support main body 40 may support the backlight unit 10 and the optical sheets 30.

The support main body 40 may be coupled to the bottom cover 20. The backlight unit 10 and the optical sheets 30 may be included in the space between the support main body 40 and the bottom cover 20 coupled to each other.

Hereinafter, the display panel 50, the printed substrate 60, and the FPC 61 will be described.

The display panel 50 may change optical properties of the backlight. The display panel 50 may change optical properties of the backlight on the basis of a polarizing structure.

A liquid crystal may be included in the display panel 50. The liquid crystal of the display panel 50 may have a predetermined polarizing structure. The polarizing structure of the liquid crystal may be formed by electrical energy being applied to the liquid crystal. As a liquid crystal control signal is applied to the display panel 50, a plurality of liquid crystals included in the display panel 50 may be arranged in predetermined directions. The polarizing structure may be defined by the arranged liquid crystals.

The printed substrate 60 may generate the liquid crystal control signal.

The FPC 61 may transmit the generated liquid crystal control signal to the display panel 50.

The display panel 50 may have a predetermined polarizing structure by the liquid crystal control signal generated in the printed substrate 60 being transmitted to the display panel 50 by the FPC 61. The backlight may be changed into light having predetermined color and output on the basis of the polarizing structure of the display panel 50.

Each of the elements of the display device 1 has been described above.

Hereinafter, positional relationships between the elements of the display device 1 will be described.

Figure 2:
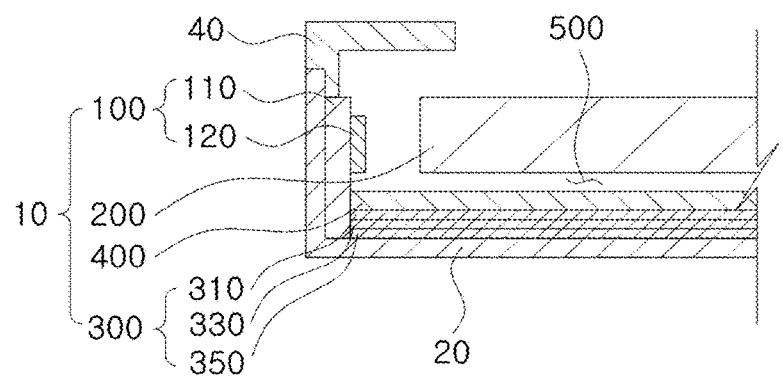
FIG. 2 is a side view illustrating the backlight unit, a support main body, and a bottom cover according to an embodiment of the present application.

FIG. 2 is a side view illustrating the backlight unit 10, the support main body 40, and the bottom cover 20 according to an embodiment of the present application.

Hereinafter, description will be given with reference to FIG. 2.

The reflective plate 300 may be disposed on the bottom cover 20. The reflective plate 300 may include a first base film 310, a reflective film 330, and a second base film 350. The reflective film 330 may be disposed between the first base film 310 and the second base film 350, and the second base film 350 may be disposed on the bottom cover 20.

The quantum dot film 400 may be disposed on the reflective plate 300.

The quantum dot film 400 may be disposed below the light guide plate 200.

The light source 110 and the light driver 120 may be disposed at a side portion of the light guide plate 200. The light driver 120 may be in contact with an inner surface of a side portion of the bottom cover 20. The light driver 120 may be in contact with a side portion of the reflective plate 300 and a side portion of the quantum dot film 400.

The support main body 40 may be coupled to an upper portion of the bottom cover 20.

The light guide plate 200 may be exposed toward the optical sheets 30 through the support main body 40.

Hereinafter, a positional relationship between the quantum dot film 400 and the light guide plate 200 will be described in detail.

The quantum dot film 400 may be spaced apart from the light guide plate 200 and disposed below the light guide plate 200.

A predetermined gap exists between the quantum dot film 400 and the light guide plate 200. The gap may be defined as an air gap 500. The quantum dot film 400 may be spaced apart from the light guide plate 200 by the air gap 500 and be disposed below the light guide plate 200.

An upper portion of the quantum dot film 400 may be exposed to the air gap 500.

The side portion of the quantum dot film 400 may be in contact with the light driver 120.

When the air gap 500 is formed between the quantum dot film 400 and the light guide plate 200, color reproducibility of the display device 1 may increase. A predetermined layer such as a barrier film implemented using an organic-inorganic composite material such as $Al_2O_3$, $SiOx$, and $SiNx$ (x is 1 to 3) may be located between the quantum dot film 400 and the light guide plate 200. In this case, the backlight output from the quantum dot film 400 may be distorted and interfered by the predetermined layer. The light conversion rate of the display panel 50 based on the white light may decrease. Conversely, when the air gap 500 is formed, light output from the quantum dot film 400 may be transmitted to the display panel 50 without interference, compared to the case in which the air gap 500 is not formed. Accordingly, the light conversion rate of the display panel 50 increases, and color reproducibility of the display device 1 can increase.

Hereinafter, a positional relationship between the quantum dot film 400 and the reflective plate 300 will be described in detail.

The quantum dot film 400 may be disposed to be in contact with the reflective plate 300. The quantum dot film 400 may cover an upper surface of the reflective plate 300.

The reflective plate 300 may include base films and the reflective film 330, and the base films may include the first base film 310 and the second base film 350. However, the elements of the reflective plate 300 are not essential elements, and the reflective plate 300 having more or less elements than the above elements may be implemented.

The first base film 310 and the second base film 350 may define an outer shape of the reflective plate 300. The first base film 310 and the second base film 350 may maintain the outer shape of the reflective plate 300.

The first base film 310 and the second base film 350 may prevent damage to the reflective film 330.

The first base film 310 and the second base film 350 may be implemented using a material for damage prevention. The material may be a PET-based material.

The reflective film 330 may receive and reflect the backlight.

The reflective film 330 may have excellent total reflection property and diffuse reflection property (irregular reflection property).

The reflective film 330 may be a diffuse reflection film, a specular reflection film, or a reflective film which is a combination of the diffuse reflection film and the specular reflection film.

The reflective film 330 may include a predetermined reflective material. When the reflective film 330 is implemented as a diffuse reflection film, the reflective film 330 may include a diffuse reflection material. The diffuse reflection material may include barium sulfate ($Ba_2SO_4$). When the reflective film 330 is implemented as a specular reflection film, the reflective film 330 may include a specular reflection material. The specular reflection material may include an aluminum (Al)-based material or a silver (Ag)-based material. When the reflective film 330 is implemented as a combination of the diffuse reflection film and the specular reflection film, the reflective film 330 may include one or more of the above-mentioned materials.

Hereinafter, arrangement relations between the elements will be described.

The quantum dot film 400 may cover an upper surface of the first base film 310.

The quantum dot film 400 may be in contact with the first base film 310. A lower surface of the quantum dot film 400 may be in contact with an upper surface of the first base film 310. The quantum dot film 400 may be in contact with the PET material included in the first base film 310.

The first base film 310 may be in contact with the reflective film 330. The lower surface of the first base film 310 may be in contact with the upper surface of the reflective film 330. The first base film 310 may be in contact with the diffuse reflection material of the reflective film 330.

The reflective film 330 may be disposed between the first base film 310 and the second base film 350. The outer shape of the reflective film 330 may be maintained by the first base film 310 and the second base film 350.

The reflective film 330 may be in contact with the first base film 310 and the second base film 350. The upper surface of the reflective film 330 may be in contact with the lower surface of the first base film 310, and the lower surface of the reflective film 330 may be in contact with the upper surface of the second base film 350. The reflective film 330 may be in contact with the PET material of the first base film 310 and the PET material of the second base film 350.

The second base film 350 may be in contact with the bottom cover 20. The lower surface of the second base film 350 may be in contact with the exposed bottom surface of the bottom cover 20.

A side portion of at least of the quantum dot film 400, the first base film 310, the reflective film 330, and the second base film 350 may be disposed to be in contact with the light driver 120.

Alternatively, the side portions of the quantum dot film 400, the first base film 310, the reflective film 330, and the second base film 350 may not be in contact with the light driver 120.

When the quantum dot film 400 is formed to be in contact with the first base film 310 of the reflective plate 300, an adhesion force between the quantum dot film 400 and the reflective plate 300 may be improved. When the first base film 310 is not implemented in the reflective plate 300, the quantum dot film 400 cannot be disposed to be in contact with the reflective film 330 of the reflective plate 300. The quantum dot film 400 includes a material which has a low adhesion force with a material included in the reflective film 330. Consequently, the adhesion force between the quantum dot film 400 and the reflective plate 300 is weak, and the quantum dot film 400 may be easily separated from the reflective plate 300 when an external force is applied to the display device 1. Conversely, when the first base film 310 is implemented in the reflective plate 300, the quantum dot film 400 may be disposed to be in contact with the first base film 310. The adhesion force may be strong because the first base film 310 and the quantum dot film 400 include predetermined inorganic members. The quantum dot film 400 may be firmly coupled to the reflective plate 300 even when an external force is applied to the display device 1.

As a result, light output from the light source 110 may be scattered from the light guide plate 200 and applied to the quantum dot film 400. The quantum dot film 400 may receive light and allow light having a different characteristic from the received light to be output downward.

Alternatively, the quantum dot film 400 may allow the modulated light to be output upward. The reflective plate 300 may reflect converted light, which was emitted downward, upward to transmit backlight to the light guide plate 200, the optical sheets 30, or the display panel 50.

In this case, the quantum dot film 400 may convert received light and emit backlight upward. The light guide plate 200 may receive backlight output from the quantum dot film 400 and backlight output from the reflective plate 300.

The quantum dot film 400 has high thermal stability and phase stability even when a predetermined barrier film is not further disposed in the quantum dot film 400.

Hereinafter, the quantum dot film 400 will be described in detail.

Embodiment 1-1

Hereinafter, Embodiment 1-1 of the quantum dot film 400 will be described.

Figure 3:
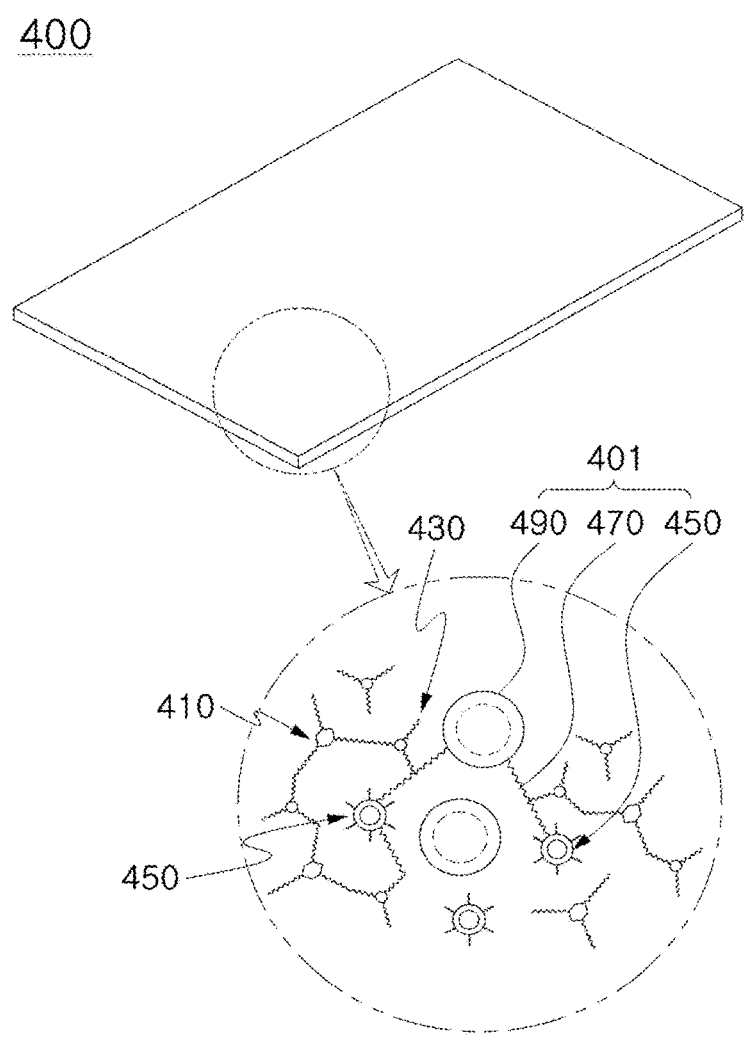
FIG. 3 is a view illustrating a quantum dot film according to an embodiment of the present application.

FIG. 3 is a view illustrating the quantum dot film 400 according to an embodiment of the present application.

The quantum dot film 400 may receive light from the light source 110 and output light in a specific wavelength band.

The quantum dot film 400 may be implemented in the shape of a film having a predetermined thickness. Alternatively, the quantum dot film 400 may be provided by being disposed in a predetermined element. The quantum dot film 400 may be provided in the form of being disposed on a predetermined substrate. The substrate may be an optical member used in the display device 1 such as a display and a lighting device.

Hereinafter, elements of the quantum dot film 400 will be described.

Referring to FIG. 3, the quantum dot film 400 may include inorganic members 430, organic members 410, and quantum dot powder 401 including quantum dots 450, beads 490, and chain molecules 470. However, elements illustrated in FIG. 3 are not essential, and the quantum dot film 400 having more elements than above may also be implemented.

The inorganic members 430 may be disposed to be in contact with the organic members 410.

The quantum dot powder 401 may be adjacent to the inorganic members 430. Each of the elements of the quantum dot powder 401 may be located between the inorganic members 430 and the organic members 410. The quantum dots 450 of the quantum dot powder 401 may receive predetermined light and output light in a specific wavelength band. The chain molecules 470 of the quantum dot powder 401 may be attached to the quantum dots 450 so that the quantum dots 450 which are adjacent to each other are spaced apart from each other. The beads 490 of the quantum dot powder 401 may be disposed between the chain molecules 470.

Hereinafter, each of the elements of the quantum dot film 400 will be described in detail.

First, the organic members 410 will be described.

Figure 4:
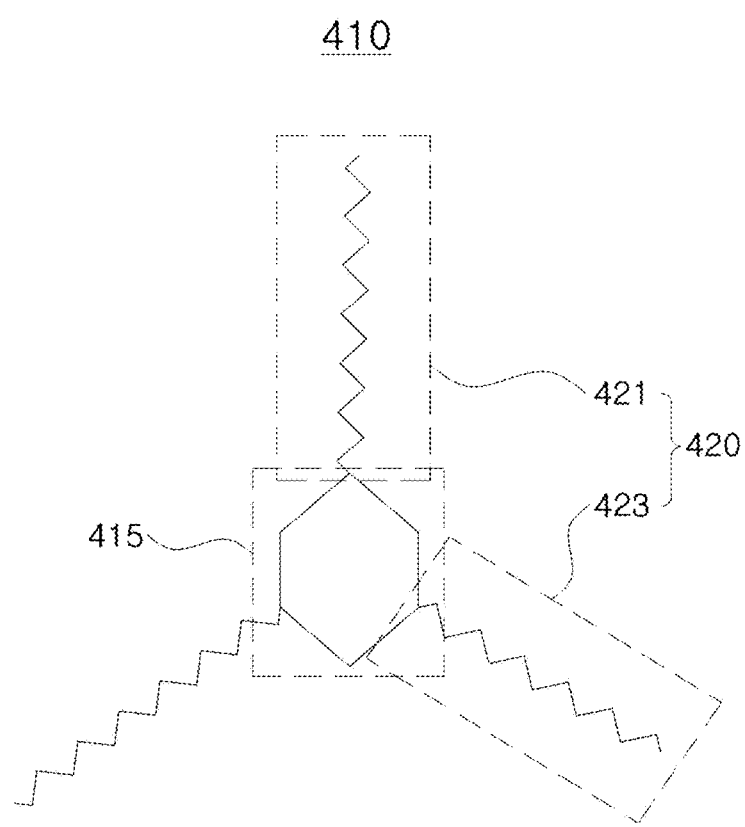
FIG. 4 is a view illustrating an organic member according to an embodiment of the present application.

FIG. 4 is a view illustrating an organic member according to an embodiment of the present application.

The organic members 410 may include a triazine-based compound and a silane-based compound.

The triazine-based compound may include a 1,3,5-triazine-based compound, a 1,2,3-triazine-based compound, and a 1,2,4-triazine-based compound. The 1,3,5-triazine-based compound may include 2,2',2"-(1,3,5-triazine-2,4,6-triyl) tris(methylazanediyl)tris(ethane-2,1-diyl)tris(3-(triethoxysilyl)propyl carbamate); 2,2',2"-(1,3,5-triazine-2,4,6-triyl)tris (azanediyl)tris(ethane-2,1-diyl)tris(3-(triethoxysilyl)propyl carbamate); 4,4',4"-(1,3,5-triazine-2,4,6-triyl)tris(azanediyl) tris(benzene-4,1-diyl)tris(3-(triethoxysilyl)propyl carbamate); and 4,4',4"-(1,3,5-triazine-2,4,6-triyl)tris(hexanediyl) tris(benzene-4,1-diyl)tris(3-(triethoxysilyl)propyl carbamate).

The silane-based compound may include ethoxysilane, diethoxysilane, ethoxytrimethyl silane, diethoxydimethyl silane, methyltriethoxysilane, tetraethoxysilane, diethoxydimethoxysilane, ethoxytrimethoxysilane, chlorotriethoxysilane, trichloromethylsilane, dichlorosilane, trichlorosilane, dichlorodimethylsilane, vinyldimethyldimethoxysilane, 2-(acryl)ethyl trimethoxysilane, 2-(methacryl)ethyl trimethoxysilane, 2-(acryloxy)ethyl trimethoxysilane, 2-(methacryloxy)ethyl trimethoxysilane, and 3-(glycidoxy)propyl trimethoxysilane (GPTMS).

When the quantum dot film 400 includes the organic members 410 including the silane-based compound, the quantum dot film 400 may have higher hardness and flexibility.

The organic members 410 may include a predetermined region.

Referring to FIG. 4, the organic member 410 may include an organic centered group 415 and organic functional groups 420 including a first organic functional group 421 and a second organic functional group 423.

The organic centered group 415 may support the organic functional groups 420.

The organic functional groups 420 may be formed to extend outward from the organic centered group 415. The organic functional groups 420 may be in contact with the organic centered group 415 and formed to extend toward the inorganic members 430.

The organic functional groups 420 may include one end and the other end. One end of the organic functional groups 420 may be defined as a portion in contact with the organic centered group 415, and the other end of the organic functional groups 420 may be defined as an end portion extending outward from the one end.

The organic centered group 415 and the organic functional groups 420 may have chemical properties different from each other. The different chemical properties may be based on chemical elements included in the organic centered group 415 and the organic functional groups 420.

The organic centered group 415 may include a nitrogen (N) atom, a carbon (C) atom, or a hydrogen (H) atom.

The organic functional groups 420 may include a halogen atom, an H atom, a silicon (Si) atom, an alkyl group (R) of carbon number 1 to 6, an alkylene group of carbon number 1 to 6, or a phenylene group.

The organic functional groups 420 may include the same chemical elements. Alternatively, the organic functional groups 420 may include different chemical elements. Chemical elements included in the first organic functional group 421 and the second organic functional group 423 may be different from each other. The number of carbons included in the first organic functional group 421 and the number of carbons included in the second organic functional group 423 may be different from each other.

A physical structure of the organic member 410 may be defined by the organic functional groups 420.

The organic functional groups 420 may have physical lengths.

The organic functional groups 420 may have various physical sizes on the basis of chemical elements included in the organic functional groups 420. The numbers of chemical elements included in the organic functional groups 420 and the physical sizes of the organic functional groups 420 may be proportional to each other. For example, the physical lengths of the organic functional groups 420 may extend in proportion to the numbers of carbons included in the organic functional groups 420.

The organic functional groups 420 may have same or similar physical sizes.

Alternatively, the organic functional groups 420 may have different physical sizes. The first organic functional group 421 may have a first length on the basis of the number of carbons of the first organic functional group 421, and the second organic functional group 423 may have a second length on the basis of the number of carbons of the second organic functional group 423.

Hereinafter, the inorganic members 430 will be described.

Figure 5:
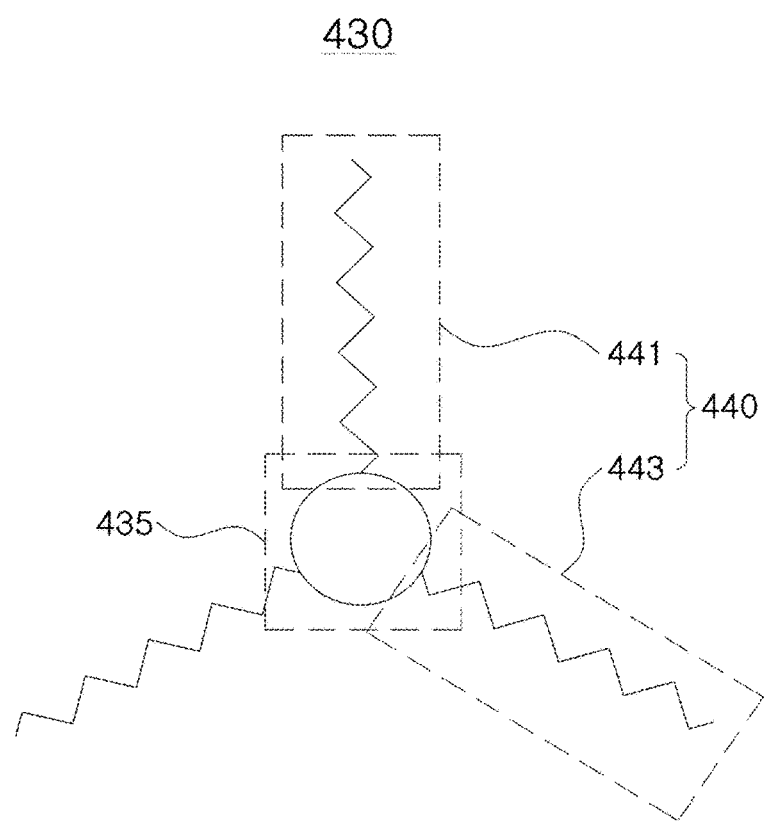
FIG. 5 is a view illustrating an inorganic member according to an embodiment of the present application.

FIG. 5 is a view illustrating an inorganic member according to an embodiment of the present application.

The inorganic member 430 may include a predetermined inorganic material.

The inorganic material may include aluminum methoxide, aluminum tetramethoxide, aluminumethoxide, aluminum propoxide, aluminum butoxide, monoethoxysilane, methyltriethoxysilane, dimethyldiethoxysilane, diphenyldiethoxysilane, triethoxysilane, tetramethoxysilane, tetraethoxysilane, titanium tetramethoxide, titanium tetraethoxide, titanium tetrapropoxide, titanium tetrabutoxide, zirconium tetramethoxide, zirconium tetraethoxide, zirconium tetrapropoxide, or zirconium tetrabutoxide.

The inorganic members 430 may include a predetermined region.

Referring to FIG. 5, the inorganic member 430 may include an inorganic centered group 435 and inorganic functional groups 440 including a first inorganic functional group 441 and a second inorganic functional group 443. However, elements illustrated in FIG. 5 are not essential, and the inorganic member 430 having more elements than above may also be implemented. For example, the inorganic member 430 may also be implemented as an inorganic member 430 including four inorganic functional groups 440.

The inorganic centered group 435 may support the inorganic functional groups 440.

The inorganic functional groups 440 may be formed to extend outward from the organic centered group 435. The inorganic functional groups 440 may be in contact with the inorganic centered group 435 and formed to extend toward the chain molecules 470.

The inorganic functional groups 440 may include one end and the other end. One end of the inorganic functional groups 440 may be defined as a portion in contact with the inorganic centered group 415, and the other end of the inorganic functional groups 440 may be defined as an end portion extending outward from the one end.

The inorganic centered group 435 and the inorganic functional groups 440 may have chemical properties different from each other. The different chemical properties may be based on chemical elements included in the inorganic centered group 435 and the inorganic functional groups 440.

The inorganic centered group 435 may include one or more inorganic chemical elements selected from a group consisting of Group 3A, 4A, and 4B of the periodic table.

The inorganic functional groups 440 may include an H atom, a hydroxyl group, an alkyl group of carbon number 1 to 6, an alkoxy group of carbon number 1 to 6, a phenyl group, or a xylyl group.

The inorganic functional groups 440 may include the same chemical elements.

Alternatively, the inorganic functional groups 440 may include different elements. Chemical elements included in the first inorganic functional group 441 and the second inorganic functional group 443 may be different from each other. The number of carbons included in the first inorganic functional group 441 and the number of carbons included in the second inorganic functional group 443 may be different from each other.

A physical structure of the inorganic member 430 may be defined by the inorganic functional groups 440.

The inorganic functional groups 440 may have physical lengths.

The inorganic functional groups 440 may have various physical sizes on the basis of chemical elements included in the inorganic functional groups 440. The numbers of chemical elements included in the inorganic functional groups 440 and the physical sizes of the inorganic functional groups 440 may be proportional to each other. For example, the physical lengths of the inorganic functional groups 440 may extend in proportion to the numbers of carbons included in the inorganic functional groups 440.

The inorganic functional groups 440 may have like or similar physical sizes.

Alternatively, the inorganic functional groups 440 may have different physical sizes. The first inorganic functional group 441 may have a first length on the basis of the number of carbons of the first inorganic functional group 441, and the second inorganic functional group 443 may have a second length on the basis of the number of carbons of the second inorganic functional group 443.

The organic members 410 and the inorganic members 430 have been described above.

Hereinafter, the quantum dot powder 401 adjacent to the organic members 410 and the inorganic members 430 will be described.

First, the quantum dots 450 will be described.

Figure 6:
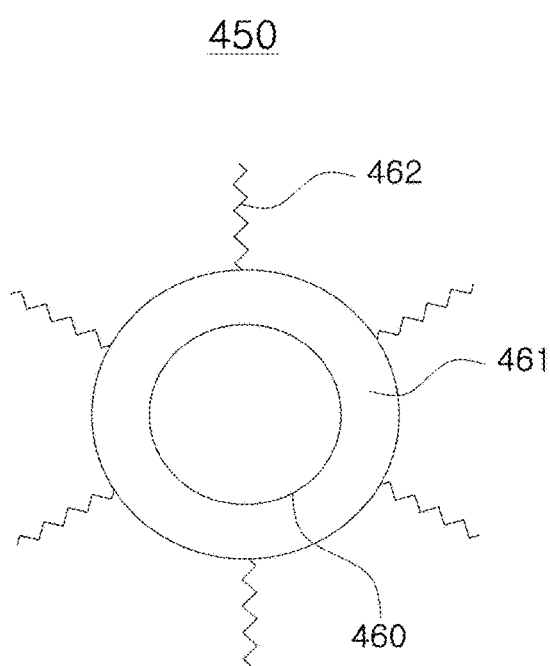
FIG. 6 is a view illustrating a quantum dot according to an embodiment of the present application.

FIG. 6 is a view illustrating a quantum dot according to an embodiment of the present application.

Hereinafter, description will be given with reference to FIG. 6.

The quantum dots 450 are nano sized semiconductor materials and are materials having a quantum confinement effect.

The quantum dots 450 may emit light on the basis of the quantum confinement effect. When the quantum dots 450 absorb light from an excitation source and reach an energy excitation state, the quantum dots 450 autonomously emit energy corresponding to energy band gaps of the quantum dots 450. The quantum dots 450 receive predetermined light such that the quantum dots 450 have excitation electrons and emit energy as the excitation electrons are stabilized.

The quantum dots 450 may have various energy gaps according to the sizes of the quantum dots 450 or chemical compositions of the quantum dots 450. The quantum dots 450 may emit light in a specific wavelength band corresponding to the energy gaps. The sizes or chemical compositions of the quantum dots 450 may be changed to emit light in the specific wavelength band.

The quantum dots 450 may be implemented using a predetermined compound. The predetermined compound may be at least one compound of a II-VI group compound, a III-V group compound, and a IV-VI group compound.

The II-VI compound may be selected from a group consisting of two-element compounds such as CdSe, CdTe, ZnS, ZnSe, ZnTe, ZnO, HgS, HgSe, and HgTe, three-element compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, and HgZnSe, and four-element compounds such as HggZnTe, CdZnSeS, CdZnSeTe, CdZnSTe, CdHgSeS, CdHgSeTe, CdHgSTe, HgZnSeS, HgZnSeTe, and HgZnSTe.

The III-V group compound may be selected from a group consisting of two-element compounds such as GaN, GaP, GaAs, GaSb, AlN, AlP, AlAs, AlSb, InN, InP, InAs, and InSb, three-element compounds such as GaNP, GaNAs, GaNSb, GaPAs, GaPSb, AlNP, AlNAs, AlNSb, AlPAs, AlPSb, InNP, InNAs, InNSb, InPAs, InPSb, and GaAlNP, and four-element compounds such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb.

The IV-VI group compound may be selected from a group consisting of two-element compounds such as SnS, SnSe, SnTe, PbS, PbSe, and PbTe, three-element compounds such as SnSeS, SnSeTe, SnSTe, PbSeS, PbSeTe, PbSTe, SnPbS, SnPbSe, and SnPbTe, and four-element compounds such as SnPbSSe, SnPbSeTe, and SnPbSTe.

The IV-group compound may be selected from a group consisting of single-element compounds such as S1 and Ge and two-element compounds such as SiC and SiGe.

The quantum dot 450 may have a core-shell structure.

The quantum dot 450 having the core-shell structure may include a quantum core 460, a quantum shell 461, and a ligand 462.

The quantum core 460 may emit light on the basis of the quantum confinement effect.

The quantum shell 461 may cover the quantum core 460. The quantum shell 461 may protect the quantum core 460. The quantum shell 461 may prevent an energy band of the quantum core 460 from changing.

The ligand 462 may be formed at a surface of the quantum dot 450.

The quantum core 460 and the quantum shell 461 may be implemented using the above-mentioned compounds.

The ligand 462 may be formed at a surface of the quantum shell 461.

The ligand 462 may be a compound that forms a coordinate bond by providing a shared electron pair to the quantum dot 450.

The ligand 462 may include i) an organic ligand, ii) an inorganic ligand, or iii) a combined ligand in which the above-mentioned ligands are combined.

The organic ligand may be an alkyl chain molecule. The alkyl chain molecule may include at least one of an oleic acid (OA), 1,2-ethylenedithiol(EDT), 1,4-butanedithiol (BDT), and 3-mecaptopropionic acid(MPA).

The inorganic ligand may include at least one of an ether-based compound, an unsaturated hydrocarbon, and an organic acid. A solvent used as the inorganic ligand may include at least one of an ether-based compound, an unsaturated hydrocarbon, and an organic acid.

The ether-based compound may include at least one of tri-n-Octylphosphine oxide, (TOPO), alkylphosphine, octyl ether, and benzyl ether.

The unsaturated hydrocarbon may include at least one of octane or octadecane.

The organic acid may include at least one of an oleic acid, a stearic acid, a myristic acid, and a hexadecanoic acid.

Thermal stability may be improved by the ligand 462 included in the above-described quantum dot 450. Also, the ligand 462 may prevent a plurality of quantum dots 450 from aggregating with each other and prevent deterioration of optical efficiency.

The ligand 462 may have a predetermined length. The length may be proportional to the number of C included in the ligand 462. As the number of C included in the ligand 462 is larger, the length of the ligand 462 may be longer.

The elements illustrated in FIG. 6 are not essential, and the quantum dot 450 having more or less elements than the above may also be implemented. For example, a predetermined coating layer may be formed on the quantum shell 461 of the quantum dot 450. The coating layer may be a layer that is implemented so that durability of the quantum dot 450 is improved.

Hereinafter, the chain molecules 470 will be described.

Figure 7:
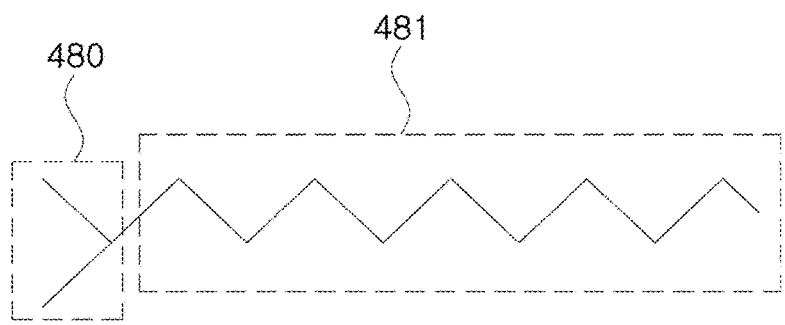
FIG. 7 is a schematic view illustrating a chain molecule according to an embodiment of the present application.

FIG. 7 is a schematic view illustrating a chain molecule according to an embodiment of the present application.

Referring to FIG. 7, the chain molecule 470 may include a head 480 and a tail 481.

The head 480 and the tail 481 may have predetermined chemical properties. The chemical properties may include a hydrophilic property and a hydrophobic property.

The hydrophilic property may be defined by a predetermined hydrophilic group. For example, the hydrophilic group may be one of a hydroxyl group (—OH), a carboxyl group (—COOH), and amino groups (—NHRh, —NH2, —NRh2, where the R is an alkyl group).

The hydrophobic property may be defined by a predetermined hydrophobic group. For example, the hydrophobic group may be a hydrocarbon group (CnHm).

The head 480 and the tail 481 may have chemical properties different from each other. For example, the tail 481 is hydrophobic when the head 480 is hydrophilic, and the tail 481 is hydrophilic when the head 480 is hydrophobic.

Alternatively, the head 480 and the tail 481 may have the same chemical properties.

The tail 481 may have a predetermined chemical shape. For example, when the tail 481 is a hydrocarbon group, the chemical shape of the tail 481 may be a "chain shape (  ).

The tail 481 may define a physical structure of the chain molecule 470. The chain molecule 470 may have a predetermined physical length by the tail 481. For example, when the tail 481 is a hydrocarbon group, the tail 481 may have a predetermined length on the basis of the number of C included therein. The length of the tail 481 may be proportional to the number of C included therein.

The length of the chain molecule 470 is longer than the length of the ligand 462. The number of C included in the chain molecule 470 may be larger than the number of C included in the ligand 462.

The above-described chain molecule 470 may be a stearic compound. The chain molecule 470 may be, for example, a type of stearate. The stearate may include magnesium stearate, calcium stearate, zinc stearate, lithium stearate, natrium stearate, and aluminum stearate.

When the chain molecule 470 is zinc stearate, the chain molecule 470 may include the head 480 formed of a carboxyl group (hydrophilic group) and the tail 481 formed of a hydrocarbon group (hydrophobic group).

Hereinafter, the beads 490 will be described.

Figure 8:
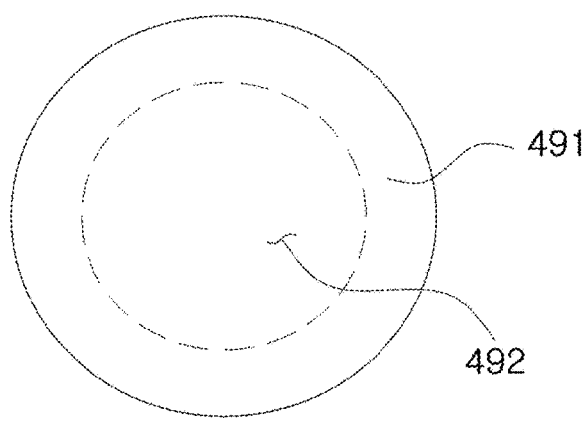
FIG. 8 is a view illustrating a bead according to an embodiment of the present application.

FIG. 8 is a view illustrating a bead according to an embodiment of the present application.

Referring to FIG. 8, the bead 490 includes a bead shell 491, and an inner space 492 may be defined by the bead shell 491.

The bead shell 491 may define an outer shape of the bead 490. The bead shell 491 may be formed so that the outer shape of the bead 490 is a spherical shape.

The bead shell 491 may have predetermined optical characteristics. The optical characteristics may include a light transmitting property and a light scattering property.

The bead shell 491 may transmit light incident on the bead shell 491. The bead shell 491 may be implemented using a material having a high light transmitting property. For example, the bead shell 491 may be implemented using a silica-based material such as silicon oxide ($SiO_2$).

The bead shell 491 may scatter light incident on the bead shell 491.

The bead shell 491 may be implemented in various thicknesses according to purposes. For example, the bead shell 491 may be formed in thin thickness so that the light transmitting property of the bead shell 491 is improved. Alternatively, the bead shell 491 may be formed in thick thickness so that durability of the bead shell 491 is improved. Alternatively, the bead shell 491 may be formed in appropriate thickness in which the light transmitting property and the durability are simultaneously taken into consideration.

The inner space 492 may be filled with a predetermined filler, but the inner space 492 may be empty. In this case, a state of the bead 490 may be defined as a hollow core state.

In the case of the bead 490 implemented in the hollow core state, the optical characteristics of the bead 490 may be improved.

When the bead 490 is in the hollow core state, the light transmitting property of the bead 490 may be improved. When the bead 490 is filled with a predetermined filler, the filler may hinder light output through the bead 490. When predetermined light is incident on the bead shell 491 of the bead 490, and the bead shell 491 transmits light, the transmitted light may be shielded by the filler. Accordingly, light output from the bead 490 may be hindered. Conversely, when the bead 490 is in the hollow core state, light transmitted through the bead shell 491 may not be shielded and spread from inside the bead 490. In this case, the light can be output to the outside of the bead 490 without being hindered much. Accordingly, when the bead 490 is in the hollow core state, the light transmitting property of the bead 490 may be improved.

When the bead 490 is in the hollow core state, the light scattering property of the bead 490 may be improved. When the bead 490 is filled with a filler, light scattered through the bead shell 491 may be shielded by the filler. Conversely, in the case of the bead 490 in the hollow core state, light scattered from a part of the bead shell 491 may spread without being shielded from inside the bead 490. The spread light may be re-scattered to other regions of the bead shell 491. The re-scattered light may be output to the outside of the bead 490. Accordingly, in the case of the bead 490 in the hollow core state, the light scattering property of the bead 490 may be improved.

When the bead 490 is filled with a predetermined filler, the filler may be a material having a high light transmitting property.

Elements illustrated in FIG. 8 are not essential, and the bead 490 having more or less elements than the above may also be implemented.

For example, the bead 490 may further include a predetermined coating layer disposed on the bead shell 491. The predetermined coating layer may be a layer formed so that the optical characteristics of the bead 490 are improved.

For example, the above-described bead 490 may be a hollow silica bide.

The quantum dot film 400 may further include an element that is not illustrated in FIG. 3.

The quantum dot film 400 may further include a predetermined mineral.

The mineral may be at least one of a montmorillonite (MMT), a halloysite, a bentonite, and a hectorite.

The mineral may have a plate shape or a tubular shape. In this case, weatherproof performance of the quantum dot film 400 may be improved.

Alternatively, the quantum dot film 400 may be provided in the form of being disposed on a predetermined substrate.

The substrate may be a substrate that is implemented using polycarbonate (PC), polyarylate (PAR), polyethersulfone (PES), polyimide (PI), PET, polyethylene naphthalate (PEN), and polyether ether ketone (PEEK).

Hereinafter, positional relationships and bonding relationships between the elements of the quantum dot powder 401 will be described.

Figure 9:
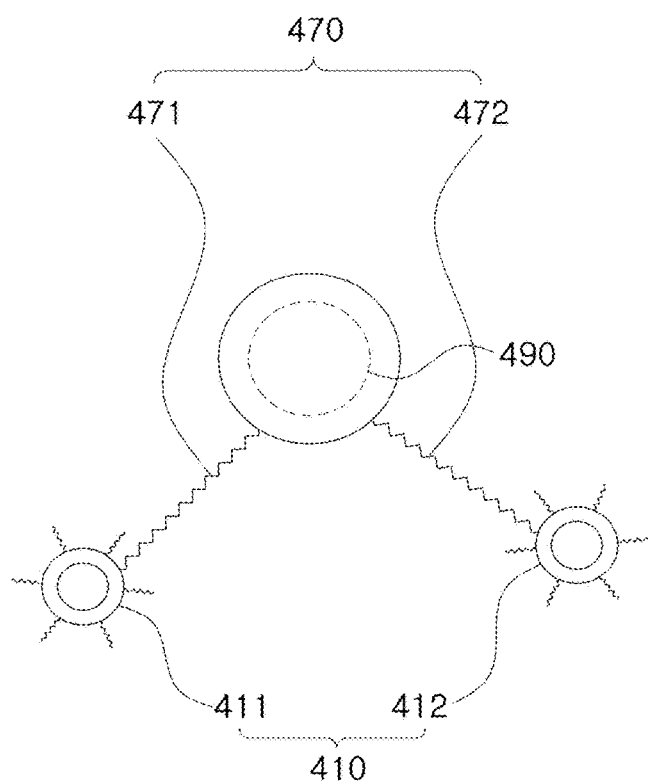
FIG. 9 is a view illustrating the quantum dot, the chain molecule, and the bead according to an embodiment of the present application.

FIG. 9 is a view illustrating the quantum dots 450, the chain molecules 470, and the bead 490 according to an embodiment of the present application. Hereinafter, description will be given with reference to FIG. 9. The quantum dots 450 may include a first quantum dot 451 and a second quantum dot 452, and the chain molecules 470 may include a first chain molecule 471 and a second chain molecule 472.

The quantum dots 450 and the chain molecules 470 may have predetermined positional relationships and bonding relationships. That is, the quantum dots 450 and the chain molecules 470 may be attached to each other. The chain molecules 470 and the bead 490 may have predetermined positional relationships and bonding relationships. That is, the chain molecules 470 and the bead 490 may be attached to each other.

First, relationships between the quantum dots 450 and the chain molecules 470 will be described.

The chain molecules 470 may be attached to the quantum dots 450. The first chain molecule 471 may be attached to the first quantum dot 451, and the second chain molecule 472 may be attached to the second quantum dot 452. The chain molecules 470 may be attached to parts of the quantum cells 461 of the quantum dots 450.

The parts of the chain molecules 470 may be attached to the quantum dots 450. The parts of the chain molecules 470 may be parts of the heads 480 of the chain molecules 470. Alternatively, the parts of the chain molecules 470 may be parts of the tails 481 of the chain molecules 470. The head 480 of the first chain molecule 471 may be attached to the quantum dot 450, and the tail 481 of the second chain molecule 472 may be attached to the quantum dot 450.

One ends of the chain molecules 470 may be attached to the quantum dots 450. The one ends of the chain molecules 470 may be ends of the heads 480 of the chain molecules 470. Alternatively, the one ends of the chain molecules 470 may be ends of the tails 481 of the chain molecules 470. An end of the head 480 of the first chain molecule 471 may be attached to the quantum dot 450, and an end of the tail 481 of the second chain molecule 472 may be attached to the quantum dot 450.

The chain molecules 470 may be attached to a region of the quantum dots 450 between adjacent ligands 462.

The attachments may be performed by electrical attraction or chemical bonds. The electrical attraction may include Vanderwalls attraction, Coulomb's attraction, and the like. The chemical bonds may include a covalent bond, a coordinate bond, a dipole-dipole interaction, and the like.

As the chain molecules 470 are attached to the quantum dots 450, dispersibility of the quantum dots 450 in the quantum dot film 400 may be improved. When the chain molecules 470 and the quantum dots 450 of the quantum dot film 400 are not attached to each other, the quantum dots 450 in the quantum dot film 400 may become adjacent to each other. Accordingly, the quantum dots 450 which are adjacent to each other may be aggregated with each other. Conversely, when the chain molecules 470 and the quantum dots 450 are attached to each other, the quantum dots 450 in the quantum dot film 400 may be located apart from each other. Accordingly, aggregation of the quantum dots 450 can be reduced, and dispersibility of the quantum dots 450 can be improved.

Hereinafter, relationships between the chain molecules 470 and the bead 490 will be described.

The bead 490 may be located between adjacent chain molecules 470. The bead 490 may be located between the first chain molecule 471 and the second chain molecule 472.

The bead 490 may be located between the other regions of the adjacent chain molecules 470. The other regions may be defined as regions of the chain molecules 470 except one regions of the chain molecules 470 attached to the quantum dots 450. The bead 490 may be located between the other region of the first chain molecule 471 and the other region of the second chain molecule 472. The other regions of the adjacent chain molecules 470 may be the same elements of the chain molecules 470. For example, when the other region of the first chain molecule 471 is the head 480, the other region of the second chain molecule 472 may be the head 480, and when the other region of the first chain molecule 471 is the tail 481, the other region of the second chain molecule 472 may be the tail 481. Alternatively, the other regions of the adjacent chain molecules 470 may be different elements of the chain molecules 470.

The bead 490 may be located between the other ends of the adjacent chain molecules 470. The other end may be defined as a portion opposite to one end of the chain molecule 470 that is attached to the quantum dot 450. The bead 490 may be located between the other end of the first chain molecule 471 and the other end of the second chain molecule 472. The other ends of the adjacent chain molecules 470 may be the same elements of the chain molecules 470. For example, when the other end of the first chain molecule 471 is the head 480, the other end of the second chain molecule 472 may be the head 480, and when the other end of the first chain molecule 471 is the tail 481, the other end of the second chain molecule 472 may be the tail 481. Alternatively, the other ends of the adjacent chain molecules 470 may be different elements of the chain molecules 470.

The bead 490 may be attached to the adjacent chain molecules 470. The bead 490 may be attached to the first chain molecule 471 and the second chain molecule 472. The bead 490 may be attached to the other region or the other end of the first chain molecule 471 and the other region or the other end of the second chain molecule 472.

The attachments may be performed by electrical attraction or chemical bonds. The electrical attraction may include Vanderwalls attraction, Coulomb's attraction, and the like. The chemical bonds may include a covalent bond, a coordinate bond, a dipole-dipole interaction, and the like.

Light emitting efficiency of the quantum dot film 400 including the bead 490 may be improved. When the bead 490 is not included in the quantum dot film 400, the quantum dots 450 in the quantum dot film 400 may be in contact with each other. The quantum dots 450 that are in contact with each other may be aggregated with each other. Conversely, in the case of the quantum dot film 400 including the bead 490, the quantum dots 450 in the powder may be located apart from each other. Rays of light output from the aggregated quantum dots 450 may interfere with each other. The light emitting efficiency of the quantum dot film 400 that includes the aggregated quantum dots 450 decreases. Conversely, when the bead 490 is included in the quantum dot film 400, dispersibility of the quantum dots 450 increases. Consequently, interference between rays of light output from the quantum dots 450 may be reduced. The rays of light not interfered with each other may be output from the quantum dot film 400. Accordingly, the light emitting efficiency of the quantum dot film 400 including the bead 490 may increase.

Each of the elements in the quantum dot powder 401 has been described above.

Hereinafter, positional relationships and bonding relationships of the organic members 410, the inorganic members 430, and the quantum dot powder 401 will be described.

Figure 10:
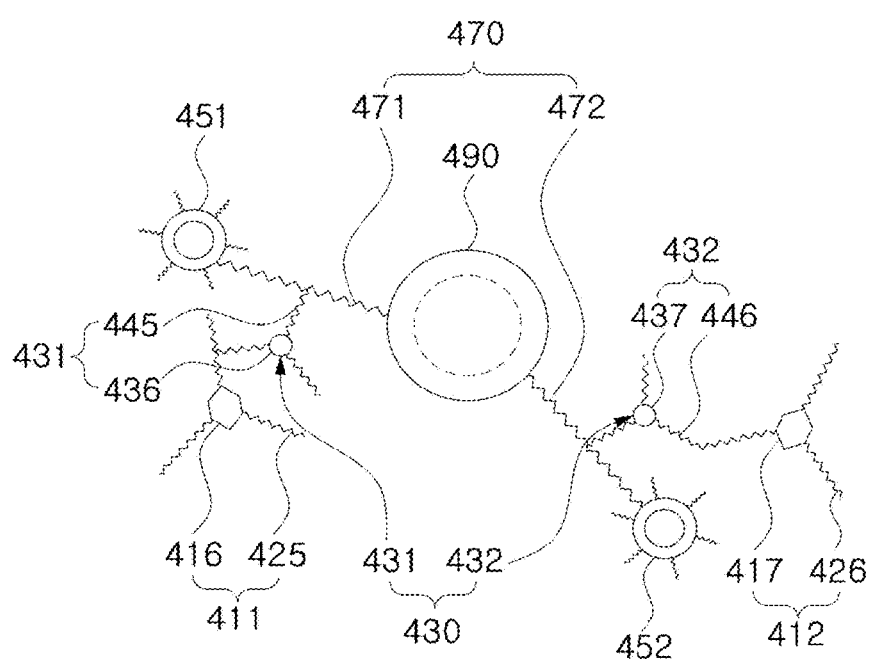
FIG. 10 is a view illustrating the organic member, the inorganic member, and a quantum dot powder according to an embodiment of the present application.

FIG. 10 is a view illustrating the organic members 410, the inorganic members 430, and a quantum dot powder 401 according to an embodiment of the present application.

Referring to FIG. 10, the organic members 410, the inorganic members 430, and the quantum dot powder 401 including the quantum dots 450, the chain molecules 470, and the bead 490 may be organically attached to each other.

For example, the organic members 410 and the inorganic members 430 may be attached to each other, the inorganic members 430 and the chain molecules 470 may be attached to each other, and the chain molecules 470 may be attached to the quantum dots 450 and the bead 490. Although the elements may be attached to each other in ways other than the above, description will be given by being limited to the above example for convenience of description.

The organic members 410 may include a first organic member 411 including a first organic centered group 416 and a first organic functional group 425 and a second organic member 412 including a second organic centered group 417 and a second organic functional group 426, the inorganic members 430 may include a first inorganic member 431 including a first inorganic centered group 436 and a first inorganic functional group 445 and a second inorganic member 432 including a second inorganic centered group 437 and a second inorganic functional group 446, the quantum dots 450 may include the first quantum dot 451 and the second quantum dot 452, and the chain molecules 470 may include the first chain molecule 471 and the second chain molecule 472.

The organic members 410 and the inorganic members 430 may be attached to each other. As illustrated in FIG. 10, the first organic member 411 and the first inorganic member 431 may be attached to each other, and the second organic member 412 and the second inorganic member 432 may be attached to each other.

In this case, the plurality of the organic members 410 may consist of the same chemical elements, or the plurality of the inorganic members 430 may consist of different chemical elements. The first organic member 411 and the second organic member 412 may consist of the same chemical elements.

Alternatively, the plurality of the organic members 410 may consist of different chemical elements, or the plurality of the inorganic members 430 may consist of the same chemical elements. The first inorganic member 431 and the second inorganic member 432 may consist of the same chemical elements. The plurality of the organic members 410 may consist of different chemical elements. The first organic member 411 and the second organic member 412 may consist of different chemical elements, and the first inorganic member 431 and the second inorganic member 432 may consist of different chemical elements. Constituent chemical elements of the first organic centered group 416 and constituent chemical elements of the second organic centered group 417 may be different from each other, constituent chemical elements of the first organic functional group 425 and constituent chemical elements of the second organic functional group 426 may be different from each other, constituent chemical elements of the first inorganic centered group 436 and constituent chemical elements of the second inorganic centered group 437 may be different from each other, and constituent chemical elements of the first inorganic functional group 445 and constituent chemical elements of the second inorganic functional group 446 may be different from each other. In other words, the length of the first organic functional group 425 and the length of the second organic functional group 426 may be different from each other.

The above-mentioned examples may be combined with each other. For example, the plurality of the organic members 410 may consist of the same chemical elements while the plurality of the inorganic members 430 consist of different chemical elements. Alternatively, the plurality of the organic members 410 may consist of different chemical elements while the plurality of the inorganic members 430 consist of the same chemical elements.

Regions of the organic members 410 and regions of the inorganic members 430 may be attached to each other. The other ends of the organic functional groups 420 of the organic members 410 may be attached to the other ends of the inorganic functional groups 440 of the inorganic members 430. The other ends of the inorganic functional groups 440 may be attached to the middle of the organic functional groups 420. The middle of the organic functional groups 420 may be defined as regions between one ends and the other ends of the organic functional groups 420.

Attached regions may be different for each of the organic members 410 and the inorganic members 430 being attached. For example, the first organic member 411 and the first inorganic member 431 may be attached to each other while the other end of the first inorganic functional group 445 is attached to the middle of the first organic functional group 425. In this case, the second organic member 412 and the second inorganic member 432 may be attached to each other while the other end of the second organic functional group 426 and the other end of the second inorganic functional group 446 are is attached to each other.

The attachment between the organic members 410 and the inorganic members 430 may be performed by electrical attraction or chemical bonds. The electrical attraction may include Vanderwalls attraction, Coulomb's attraction, and the like. The chemical bonds may include a covalent bond, a coordinate bond, a dipole-dipole interaction, and the like.

The inorganic members 430 and the chain molecules 470 may be attached to each other. Regions of the inorganic members 430 and regions of the chain molecules 470 may be attached to each other.

The other ends of the inorganic functional groups 440 of the inorganic members 430 may be attached to the heads 480 or the tails 481 of the chain molecules 470. Alternatively, the heads 480 or the tails 481 of the chain molecules 470 may be attached to the middle of the inorganic functional groups 440. That is, the other end of the first inorganic functional group 445 of the first inorganic member 431 may be attached to the head 480 or the tail 481 of the first chain molecule 471, and the head 480 or the tail 481 of the first chain molecule 471 may be attached to the middle of the second inorganic functional group 446 of the second inorganic member 432.

The inorganic members 430 may be attached to the chain molecules 470 attached to the bead 490 and the quantum dots 450.

In this case, the other ends of the inorganic functional groups 440 of the inorganic members 430 may be attached to the heads 480 or the tails 481 of the chain molecules 470. In other words, the first chain molecule 471 may be attached to the bead 490 and the first quantum dot 451, and the first inorganic member 431 may be attached to the first chain molecule 471, while the other end of the first inorganic functional group 445 of the first inorganic member 431 is attached to the head 480 or the tail 481 of the first chain molecule 471. Simultaneously, the second chain molecule 472 may be attached to the bead 490 and the second quantum dot 452, and the second inorganic member 432 may be attached to the second chain molecule 472, while the other end of the second inorganic functional group 446 of the second inorganic member 432 is attached to the head 480 or the tail 481 of the second chain molecule 472.

The attachment between the inorganic members 430 and the chain molecules 470 may be performed by electrical attraction or chemical bonds. The electrical attraction may include Vanderwalls attraction, Coulomb's attraction, and the like. The chemical bonds may include a covalent bond, a coordinate bond, a dipole-dipole interaction, and the like.

The quantum dot film 400 having the above-described organic relationships may have an effect of improving phase stability and thermal stability. When there is no organic connection relation between elements of the quantum dot film 400, the elements cannot support each other. Accordingly, the elements in the quantum dot film 400 may be easily deformed due to external conditions such as an external force, temperature, and application of light thereto.

Initial optical efficiency of the quantum dot film 400 may be easily changed due to the above-mentioned external conditions. Conversely, when there is an organic connection relation between the elements of the quantum dot film 400, the elements may support each other. As a result, the quantum dot film 400 may be robust to external conditions such as an external force, temperature, and application of light thereto. That is, thermal stability and phase stability of the quantum dot film 400 in which an organic connection relation is present between the elements may be improved compared to thermal stability and phase stability of the quantum dot film 400 in which there is no organic connection relation between the elements.

Hereinafter, an actual implementation example of the quantum dot film 400 and experimental examples on thermal stability and phase stability of the actual implementation example will be described.

Figure 11:
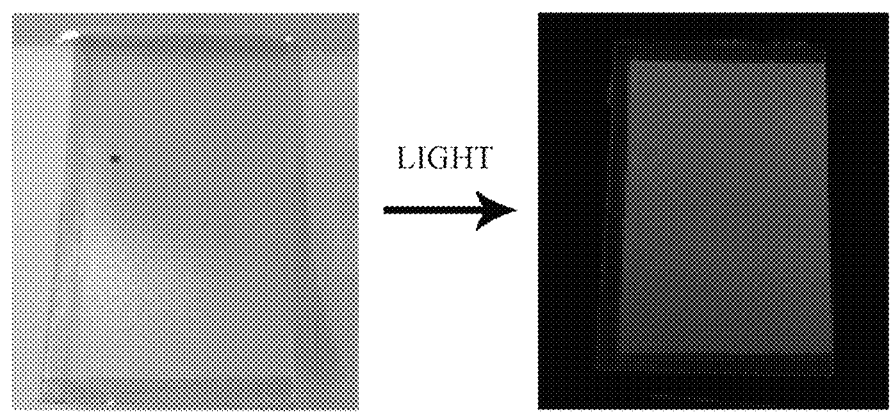
FIG. 11 is a view illustrating an actually implemented quantum dot film according to an embodiment of the present application.

FIG. 11 is a view illustrating an actually implemented quantum dot film 400 according to an embodiment of the present application.

Referring to FIG. 11, when predetermined light is applied to the actually implemented quantum dot film 400, the quantum dot film 400 may output light in a specific wavelength band. The output specific wavelength band may be controlled by adjusting the quantum dots 450 included in the quantum dot film 400. That is, the quantum dot film 400 may have various other colors that is not illustrated.

Hereinafter, experimental examples will be described.

The experimental examples include an experimental example (Experimental Example 1) in which performance of the actually implemented quantum dot film 400 was tested while the quantum dot film 400 was disposed in a lighting display device and an experimental example (Experimental Example 2) in which performance of the quantum dot film 400 was tested while the quantum dot film 400 was disposed in a predetermined substrate.

Experimental Example 1

The actually implemented quantum dot film 400 was applied to an LED package and tested.

As a result, the quantum dot film 400 disposed in the lighting device exhibited almost no decrease in light emitting efficiency (lm/W) and color index (CRI) despite the passage of time.

Table 1 below is a table showing results of Experimental Example 1.

TABLE 1

|  | lm | lm/W Value | Variation rate | Power | CIE [X] | CIE [Y] | CCT | CRI | intensity @637 nm |
|---|---|---|---|---|---|---|---|---|---|
| Downlight Bare | 987 | 106.8 |  | 9.2 | 0.313 | 0.3317 | 6470 | 83.1 | 6.87.E−03 |
| +0 hr | 865 | 93.7 | −12% | 9.2 | 0.3433 | 0.341 | 5037 | 92.2 | 1.23.E−02 |
| +236 hr | 888 | 96.2 | −10% | 9.2 | 0.3412 | 0.3395 | 5119 | 91.9 | 1.10.E−02 |
| +286 hr | 890 | 95.2 | −11% | 9.3 | 0.3427 | 0.3411 | 5060 | 92 | 1.24.E−02 |
| +408 hr | 904 | 96.6 | −9% | 9.4 | 0.3438 | 0.3416 | 5016 | 91.8 | 1.24.E−02 |
| +476 hr | 905 | 97.3 | −9% | 9.3 | 0.3428 | 0.3413 | 5057 | 91.8 | 1.22.E−02 |

Power of an LED was adjusted to a certain level, and the quantum dot film 400 disposed in the lighting device was irradiated with light.

The reduction rate of the initial light emitting efficiency (lm/W) of the quantum dot film 400 was exhibited to be very small, −9% to −12%, despite the passage of time.

Also, the initial color index of the quantum dot film 400 was maintained to be around 92 despite the passage of time.

Experimental Example 2

The actually implemented quantum dot film 400 was applied to a predetermined substrate, and phase stability and thermal stability were tested.

The experiment was carried out by aging the quantum dot film 400.

As a result, despite aging, the quantum dot film 400 rather exhibited an increase in light efficiency over time.

Experimental Example 2-1

A first experiment in which light efficiency was measured when a white LED was applied to the actually implemented quantum dot film 400 disposed on a PEN film and a second experiment in which light efficiency was measured when energy (hv) was applied to the actually implemented quantum dot film 400 were carried out.

Table 2 below shows results of testing phase stability and thermal stability while the actually implemented quantum dot film 400 was disposed on a predetermined substrate.

TABLE 2

| | Type of Experiment | | | | | |
|---|---|---|---|---|---|---|
| | First experiment | | Second experiment | | | |
| | Experimental conditions | | | | | |
| | R.T(room temperature) | | 60° C. | | hv | |
| | Light efficiency(QY) | | | | | |
| Time (hour) | Light efficiency | Variation rate | Light efficiency | Variation rate | Light efficiency | Variation rate |
| Initial | 50.6% | | 46.0% | | 48.8% | |
| 2 | 56.5% | 12% | 50.1% | 9% | 71.8% | 47% |
| 12 | 50.6% | 32% | 52.4% | 14% | 80.7% | 66% |
| 14 | 66.7% | 32% | 52.6% | 14% | 80.9% | 66% |
| 16 | 66.6% | 41% | 60.4% | 31% | 79.5% | 63% |
| 20 | 71.2% | 35% | 62.8% | 37% | 83.7% | 71% |
| 23 | 68.4% | 45% | 62.1% | 35% | 83.3% | 71% |
| 27 | 73.5% | 41% | 56.2% | 22% | 85.3% | 75% |
| 30 | 71.2% | 53% | 61.2% | 33% | 87.6% | 79% |
| 36 | 77.6% | 42% | 62.3% | 36% | 82.5% | 69% |
| 48 | 72.9% | 44% | 54.1% | 18% | 81.0% | 66% |

The light efficiency of the quantum dot film 400 disposed on the PEN film rather increased despite the passage of time (hour).

Experimental Example 2-2

A first experiment in which light efficiency was measured when a white LED was applied to the actually implemented quantum dot film 400 disposed on a PEN film and a second experiment in which light efficiency was measured when energy (hv) was applied to the actually implemented quantum dot film 400 were carried out.

TABLE 3

| | Type of Experiment | | | | | |
|---|---|---|---|---|---|---|
| | First experiment | | Second experiment | | | |
| | Experimental conditions | | | | | |
| | R.T(room temperature) | | 60° C. | | hv | |
| | Light efficiency (QY) | | | | | |
| Time (hour) | Light efficiency | Variation rate | Light efficiency | Variation rate | Light efficiency | Variation rate |
| Initial | 50.5% | | 52.8% | | 52.00% | |
| 2 | 55.1% | 9% | 51.30% | −3% | 81.30% | 57% |
| 12 | 70.8% | 40% | 60.5% | 15% | 83.20% | 60% |
| 14 | 68.4% | 35% | 57.1% | 8% | 83.20% | 60% |
| 16 | 73.0% | 45% | 62.1% | 18% | 84.60% | 63% |
| 20 | 72.0% | 44% | 66.9% | 27% | 83.00% | 60% |
| 23 | 73.2% | 45% | 65.5% | 24% | 81.30% | 57% |
| 27 | 73.9% | 46% | 67.5% | 28% | 81.10% | 56% |
| 30 | 77.6% | 54% | 68.10% | 29% | 85.90% | 65% |
| 36 | 74.6% | 48% | 65.1% | 23% | 82.50% | 58% |
| 48 | 52.8% | 48% | 60.3% | 14% | 82.50% | 58% |

The light efficiency of the quantum dot film 400 disposed on the PEN film rather increased despite the passage of time (hour).

As a result, the quantum dot film 400 of the present application has superior phase stability and thermal stability over the conventional quantum dot film 400.

In the case of the conventional quantum dot film 400, the light efficiency of the quantum dot film 400 decreases over time.

Conversely, it can be recognized from the above experimental examples that the light efficiency of the quantum dot film 400 of the present application rather increases instead of decreasing over time.

Embodiment 1-2

Hereinafter, Embodiment 1-2, which is a modified example of Embodiment 1-1, will be described. Overlapping description between Embodiment 1-1 and Embodiment 1-2 will be omitted. In the description below, unless particularly mentioned otherwise, the above described Embodiment 1-1 may be applied to Embodiment 1-2.

The organic members 410 and the inorganic members 430 included in the quantum dot film 400 may form a predetermined network structure.

Figure 12:
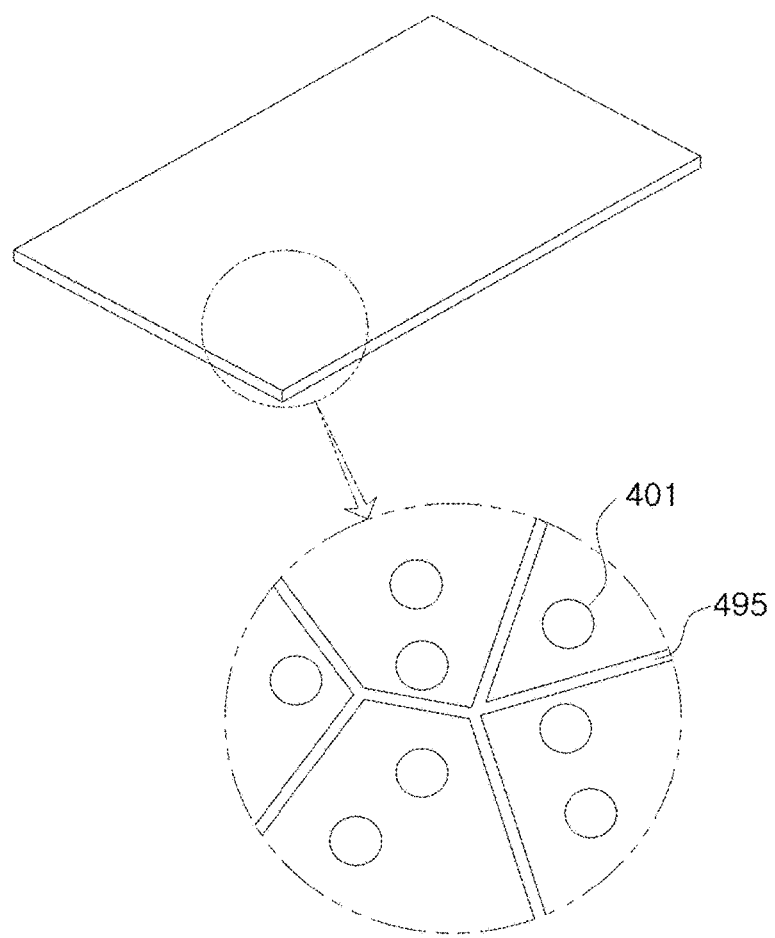
FIG. 12 is a view illustrating a quantum dot film having a network structure according to an embodiment of the present application.

FIG. 12 is a view illustrating the quantum dot film 400 having a network structure according to an embodiment of the present application.

Figure 13:
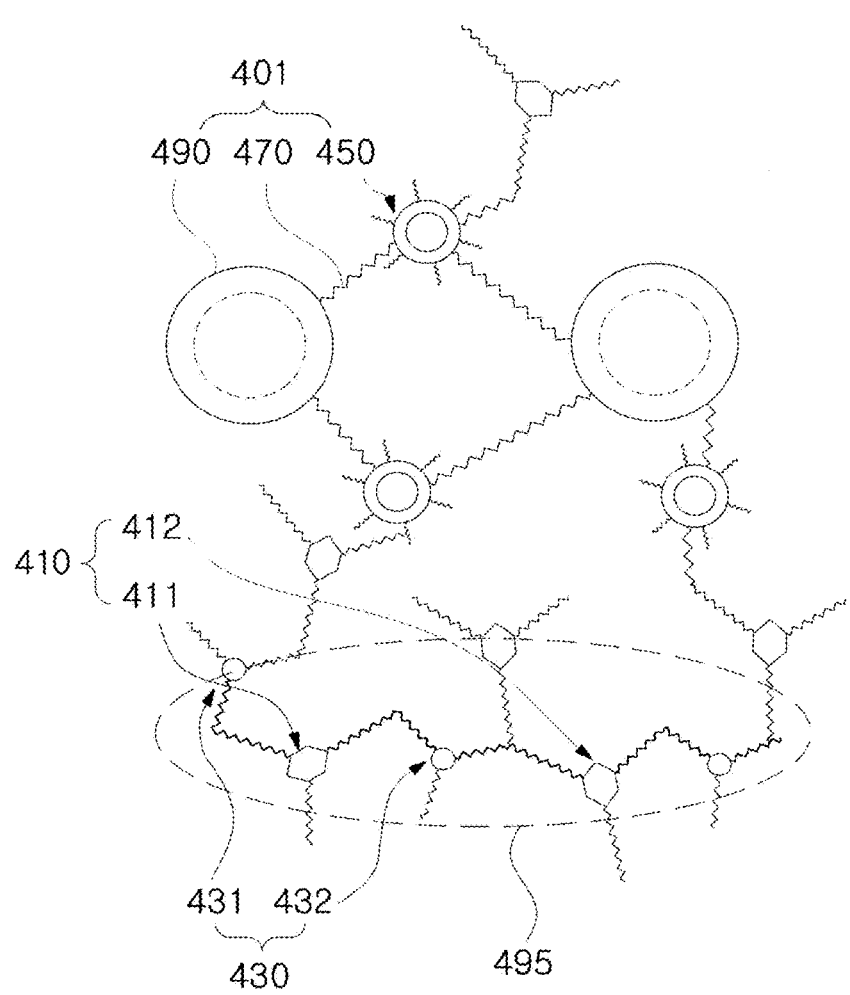
FIG. 13 is a view illustrating elements of the quantum dot film according to an embodiment of the present application.

FIG. 13 is a view illustrating elements of the quantum dot film 400 according to an embodiment of the present application.

Referring to FIG. 12, the quantum dot film 400 may include a network 495 and the quantum dot powder 401 located between a plurality of networks 495.

The network 495 may allow the quantum dot film 400 to have a predetermined network structure. The network structure may include a plurality of networks 495 and may be defined as a structure in which a predetermined space is formed between the plurality of networks 495.

Referring to FIG. 13, the network 495 may be formed by continuous attachment between the inorganic members 430 and the organic members 410. The organic members 410 may include the first organic member 411 and the second organic member 412, and the inorganic members 430 may include the first inorganic member 431 and the second inorganic member 432.

The inorganic members 430 may be located between adjacent organic members 410. The inorganic member 430 may be located between the first organic member 411 and the second organic member 412.

The inorganic members 430 may be attached to the adjacent organic members 410. One inorganic functional group 440 of the inorganic member 430 may be attached to the first organic member 411, and the other inorganic functional group 440 may be in contact with the second organic member 412. The one inorganic functional group 440 may be attached to the organic functional group 420 of the first organic member 411, and the other inorganic functional group 440 may be attached to the organic functional group 420 of the second organic member 412.

The organic members 410 may be located between adjacent inorganic members 430. The organic member 410 may be located between the first inorganic member 431 and the second inorganic member 432.

The organic member 410 may be attached to the adjacent inorganic members 430. One organic functional group 420 of the organic member 410 may be attached to the first inorganic member 431, and the other organic functional group 420 may be in contact with the second inorganic member 432. The one organic functional group 420 may be attached to the inorganic functional group 440 of the first inorganic member 431, and the other organic functional group 420 may be attached to the inorganic functional group 440 of the second inorganic member 432.

The elements of the quantum dot film 400 may be accommodated in the predetermined network structure defined by the organic members 410 and the inorganic members 430 continuously connected to each other. The organic members 410, the inorganic members 430, the quantum dots 450, the beads 490, and the chain molecules 470 may be included in the network structure.

As the network structure is formed, the quantum dot film 400 may have improved phase stability and thermal stability. The elements of the quantum dot film 400 may be deformed due to an external force applied to the quantum dot film 400. When the network structure is not formed, an impact absorbing configuration that may minimize deformation of the elements is not present. Conversely, when the network structure is formed, deformation of the elements may be prevented by the predetermined network formed by the continuously connected organic members 410 and inorganic members 430. Deformation of the elements may be minimized by the network. As a result, when the network structure is formed, the quantum dot film 400 may have superior phase stability and thermal stability over the quantum dot film 400 without the network structure.

Embodiment 1-3

Hereinafter, Embodiment 1-3, which is a modified example of Embodiment 1-1 and Embodiment 1-2 will be described. Overlapping description among Embodiment 1-1, Embodiment 1-2, and Embodiment 1-3 will be omitted. In the description below, unless particularly mentioned otherwise, the above described Embodiment 1-1 or Embodiment 1-2 may be applied to Embodiment 1-3.

The inorganic members 430 of the quantum dot film 400 of the present application may be in contact with the elements of the quantum dot film 400.

Figure 14:
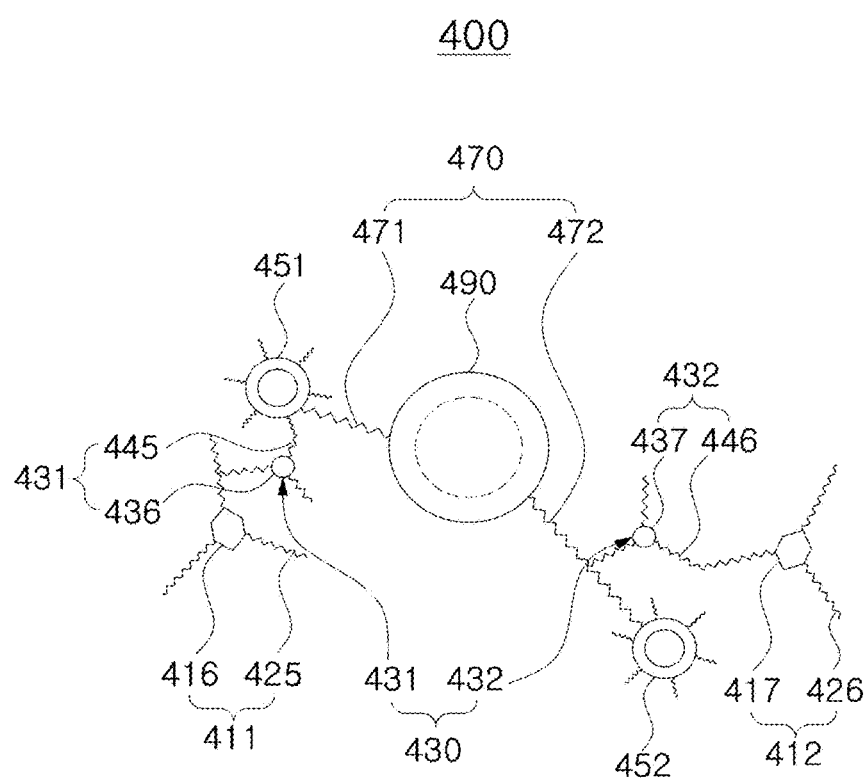
FIG. 14 is a view illustrating the inorganic member attached to a ligand of the quantum dot according to an embodiment of the present application.

FIG. 14 is a view illustrating the inorganic members 430 attached to the ligands 462 of the quantum dots 450 according to an embodiment of the present application.

Figure 15:
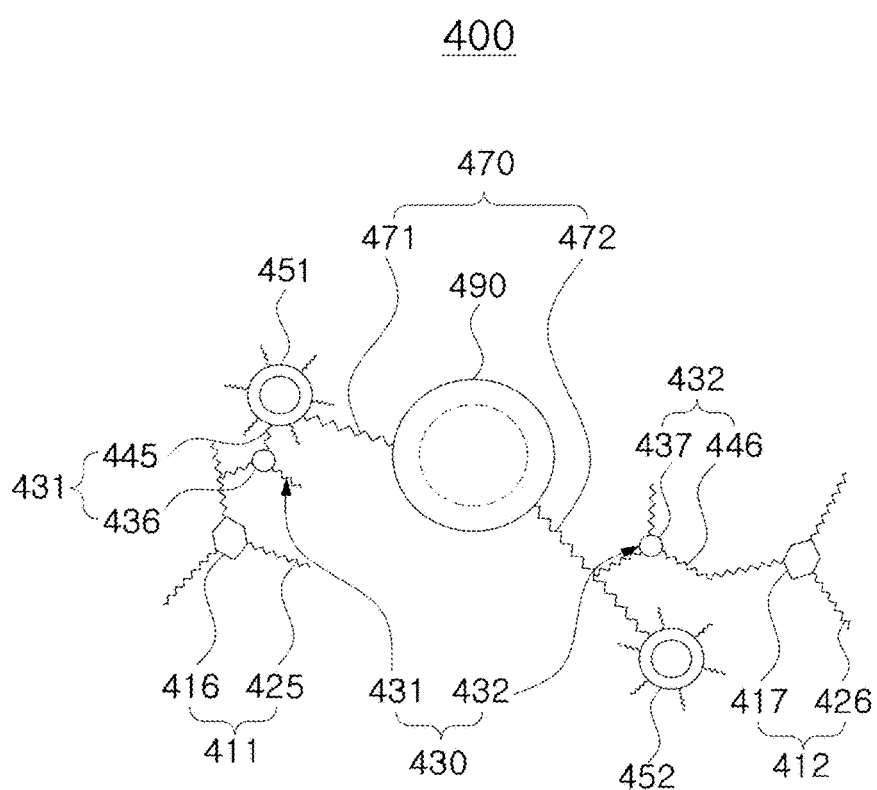
FIG. 15 is a view illustrating the inorganic member attached to a surface of the quantum dot according to an embodiment of the present application.

FIG. 15 is a view illustrating the inorganic members 430 attached to surfaces of the quantum dots 450 according to an embodiment of the present application.

Figure 16:
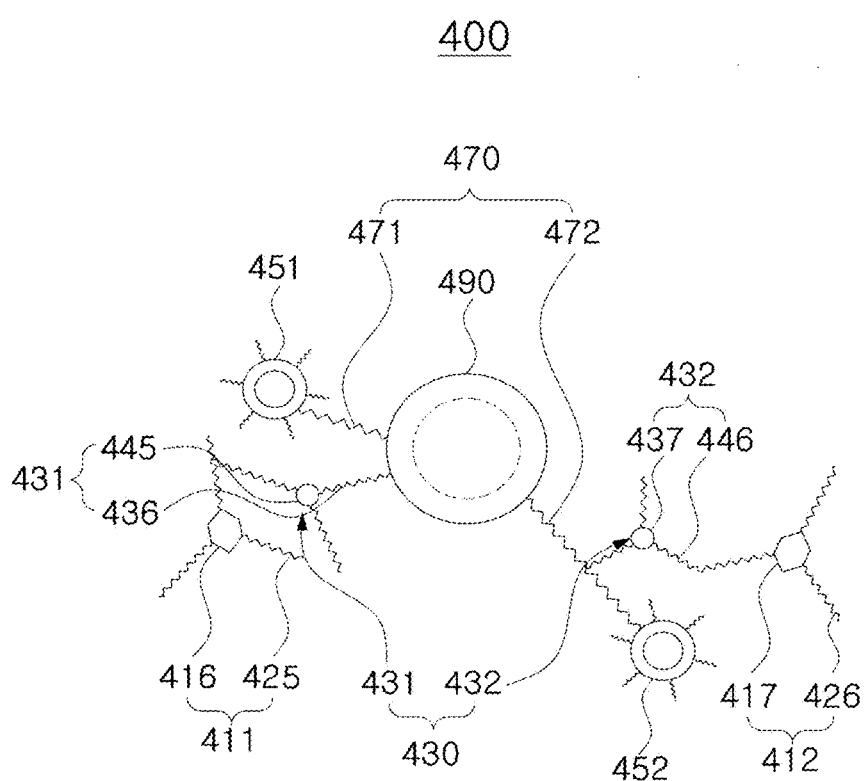
FIG. 16 is a view illustrating the inorganic member attached to the bead according to an embodiment of the present application.

FIG. 16 is a view illustrating the inorganic members 430 attached to the bead 490 according to an embodiment of the present application.

Hereinafter, description will be given with reference to FIGS. 14 to 16.

The inorganic members 430 and the ligands 462 of the quantum dots 450 may be attached to each other. The inorganic functional groups 440 of the inorganic members 430 may be in contact with the ligands 462.

The inorganic members 430 may be attached to surfaces of the quantum dots 450. The inorganic functional groups 440 of the inorganic members 430 may be in contact with the quantum shells 461 of the quantum dots 450.

The inorganic members 430 may be attached to the bead 490. The inorganic functional groups 440 of the inorganic members 430 may be in contact with a surface of the bead 490.

Ways in which the inorganic members 430 are in contact with each of the elements may be combined with each other. The inorganic members 430 may include the first inorganic member 431 and the second inorganic member 432. The first inorganic member 431 may be in contact with the chain molecule 470 while the second inorganic member 432 is in contact with the ligand 462, the quantum shell 461, the chain molecule 470, or the bead 490. The first inorganic member 431 may be in contact with the ligand 462 while the second inorganic member 432 is in contact with the ligand 462, the quantum shell 461, the chain molecule 470, or the bead 490. The first inorganic member 431 may be in contact with the quantum shell 461 while the second inorganic member 432 is in contact with the ligand 462, the quantum shell 461, the chain molecule 470, or the bead 490. The first inorganic member 431 may be in contact with the bead 490 while the second inorganic member 432 is in contact with the ligand 462, the quantum shell 461, the chain molecule 470, or the bead 490.

Ways in which the inorganic functional groups 440 are in contact with each of the elements may be combined with each other. The inorganic members 430 may include the first inorganic functional group 441 and the second inorganic functional group 443. The first inorganic functional group 441 may be in contact with the chain molecule 470 while the second inorganic functional group 443 is in contact with the ligand 462, the quantum shell 461, the chain molecule 470, or the bead 490. The first inorganic functional group 441 may be in contact with the ligand 462 while the second inorganic functional group 443 is in contact with the ligand 462, the quantum shell 461, the chain molecule 470, or the bead 490. The first inorganic functional group 441 may be in contact with the quantum shell 461 while the second inorganic functional group 443 is in contact with the ligand 462, the quantum shell 461, the chain molecule 470, or the bead 490. The first inorganic functional group 441 may be in contact with the bead 490 while the second inorganic functional group 443 is in contact with the ligand 462, the quantum shell 461, the chain molecule 470, or the bead 490.

Although the inorganic functional groups 440 of the inorganic members 430 have been described above as being in contact with each of the elements of the quantum dot film 400, the inorganic centered groups 435 of the inorganic members 430 may be in contact with each of the elements of the quantum dot film 400. For example, the ligands 462 may be in contact with the inorganic centered groups 435 of the inorganic members 430.

Although the inorganic members 430 have been described above as being in contact with each of the elements of the quantum dot film 400, the organic members 410 may be in contact with each of the elements of the quantum dot film 400. Because the organic members 410 being in contact with each of the elements of the quantum dot film 400 is similar with the inorganic members 430 being in contact with each of the elements of the quantum dot film 400, which is described above, overlapping description will be omitted.

Hereinafter, relationships between each of the elements of the display device 1 and each of the elements of the quantum dot film 400 will be described.

Each of the elements of the quantum dot film 400 may be in contact with each of the elements of the display device 1.

Each of the elements of the quantum dot film 400 may be in contact with the reflective plate 300. Each of the elements of the quantum dot film 400 may be in contact with the first base film 310 of the reflective plate 300.

The organic members and the inorganic members of the quantum dot film 400 may be in contact with the reflective plate 300. The organic members 410 and the inorganic members 430 may be in contact with the first base film 310 of the reflective plate 300. The organic functional groups 420 of the organic members 410 and the inorganic functional groups 440 of the inorganic members 430 may be in contact with the upper surface of the first base film 310.

The quantum dot powder 401 disposed between the organic members 410 and the inorganic members 430 may be in contact with the reflective plate 300. The quantum dot powder 401 of the quantum dot film 400 may be in contact with the reflective plate 300. The quantum dot powder 401 may be in contact with the upper surface of the first base film 310 of the reflective plate 300.

The quantum dots 450, the chain molecules 470, or the beads 490 included in the quantum dot powder 401 may be in contact with the reflective plate 300. The quantum dots 450, the chain molecules 470, or the beads 490 may be in contact with the upper surface of the first base film 310 of the reflective plate 300.

Each of the elements of the quantum dot film 400 may be in contact with the light driver 120.

At last one of the organic members 410, the inorganic members 430, or each of the elements of the quantum dot powder 401 of the quantum dot film 400 may be in contact with the light driver 120.

Hereinafter, an experimental example will be described.

The experimental example is an example in which light efficiency of the quantum dot film 400 disposed below the light guide plate 200 was tested compared to light efficiency of the quantum dot film 400 disposed above the light guide plate 200.

The experiment was carried out with respect to the quantum dot film 400 having a thickness of 200 μm and the quantum dot film 400 having a thickness of 400 μm.

Figure 17:
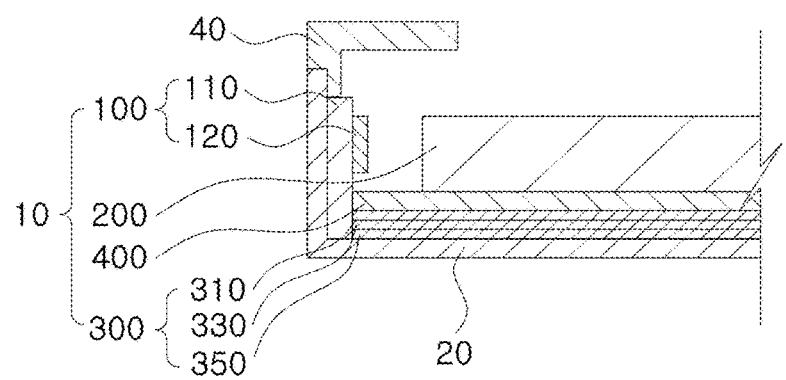
FIG. 17 is a side view illustrating a backlight unit, a support main body, and a bottom cover according to an embodiment of the present application.

FIG. 17 is a side view illustrating the backlight unit 10, the support main body 40, and the bottom cover according to an embodiment of the present application.

Referring to FIG. 17, the quantum dot film 400 may be in contact with the light guide plate 200. An upper surface of the quantum dot film 400 may be in contact with a lower surface of the light guide plate 200.

When the quantum dot film 400 is disposed to be in contact with the light guide plate 200, light emitting efficiency of the display device may increase. When a gap exists between the quantum dot film 400 and the light guide plate 200, the quantum dot film 400 may be disposed to be more apart from the light source 110 compared to the case in which the quantum dot film 400 and the light guide plate 200 are in contact with each other. Accordingly, it may be difficult for the quantum dot film 400 to receive light emitted from the light source 110. The quantum dot film 400 is unable to generate a sufficient amount of modulated light. Conversely, when the quantum dot film 400 is disposed to be in contact with the light guide plate 200, the quantum dot film 400 may be disposed to be close to the light source 110. Accordingly, the quantum dot film 400 may receive more light from the light source 110 and generate a sufficient

TABLE 4

| Film Type | Reference example (Quantum dot film is disposed above light guide plate) | | | Experimental example (Quantum dot film is disposed below light guide plate) | | | |
|---|---|---|---|---|---|---|---|
| | Luminance (cd/m$^2$) | CIE x | CIE y | Luminance (cd/m$^2$) | Increases in luminance compared to reference example (%) | CIE x | CIE y |
| QD 200 μm_White | 153 | 0.4159 | 0.4304 | 163 | 6 | 0.3896 | 0.3962 |
| QD 200 μm_Blue | 6 | 0.165 | 0.0878 | 7 | | 0.1619 | 0.0685 |
| QD 200 μm_Green | 109 | 0.3426 | 0.6278 | 115 | | 0.338 | 0.6262 |
| QD 200 μm_Red | 38 | 0.6643 | 0.329 | 40 | | 0.6607 | 0.3287 |
| QD 400 μm_White | 148 | 0.4362 | 0.4585 | 153 | 3 | 0.3917 | 0.4014 |
| QD 400 μm_Blue | 4 | 0.1709 | 0.1078 | 6 | | 0.1622 | 0.067 |
| QD 400 μm_Green | 107 | 0.3563 | 0.6217 | 110 | | 0.3447 | 0.6227 |
| QD 400 μm_Red | 36 | 0.6648 | 0.3308 | 37 | | 0.6596 | 0.3304 |

It can be recognized that luminance increases in the case in which the quantum dot film 400 is disposed below the light guide plate 200 compared to the case in which the quantum dot film 400 is disposed above the light guide plate 200.

Second Embodiment

Hereinafter, a second embodiment, which is a modified example of the first embodiment, will be described. Overlapping description between the first embodiment and the second embodiment will be omitted. In the description below, unless particularly described otherwise, the above-described first embodiment may be applied to the second embodiment.

amount of modulated light. As a result, the light emitting efficiency of the display device may increase.

Third Embodiment

Hereinafter, a third embodiment, which is a modified example of the first and second embodiments, will be described. Overlapping description among the first and second embodiments and the third embodiment will be omitted. In the description below, unless particularly described otherwise, the above-described first and second embodiments may be applied to the third embodiment.

Figure 18:
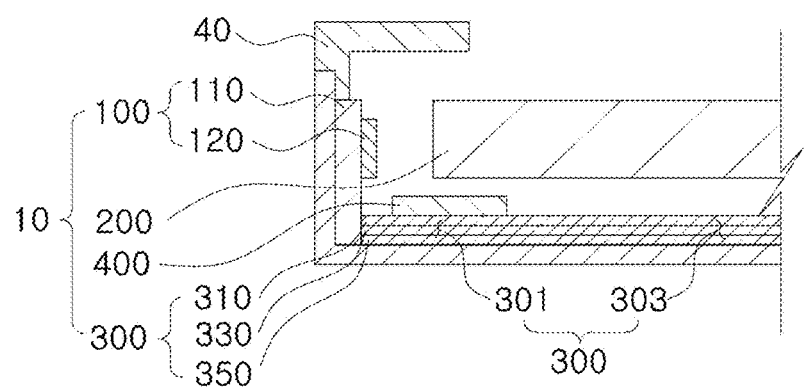
FIG. 18 is a side view illustrating the backlight unit, the support main body, and the bottom cover according to an embodiment of the present application.

FIG. 18 is a side view illustrating the backlight unit 10, the support main body 40, and the bottom cover 20 according to an embodiment of the present application.

Figure 19:
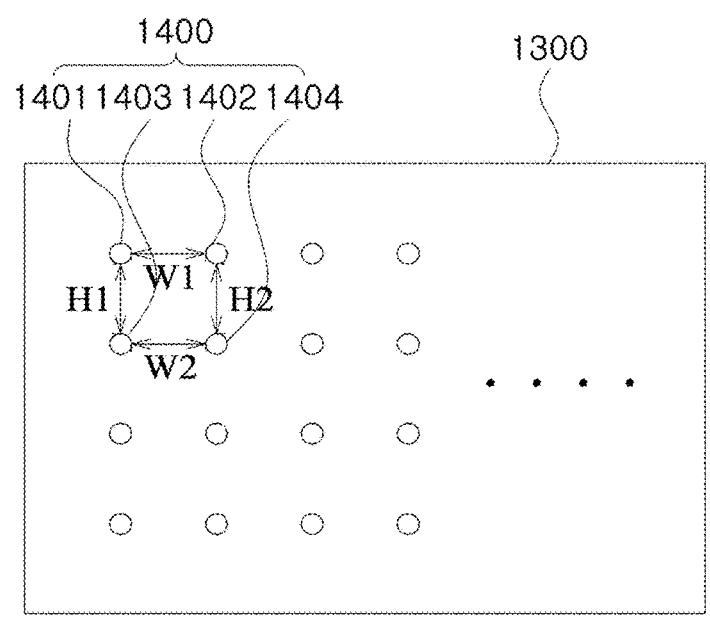
FIG. 19 is a view illustrating a quantum dot film formed in the shape of a dot according to an embodiment of the present application.

FIG. 19 is a view illustrating quantum dot films 1400 each formed in the shape of a dot according to an embodiment of the present application.

Referring to FIG. 18, the quantum dot films 1400 may be disposed at a part of the reflective plate 300, and the light unit 100 may be disposed to be adjacent to the part. The reflective plate 300 may include a first region 301 and a second region 303. The first region may be defined as a region of the reflective plate 300 disposed to be adjacent to the light source 110, and the second region may be defined as a region of the reflective plate 300 disposed to be distant from the light source 110.

The quantum dot films 1400 may be disposed on the first region 301 of the reflective plate 300. The quantum dot films 1400 may be disposed on the first region 301 of the first base film.

The light source 110 of the light unit 100 may be disposed to be adjacent to the first region 301. The light source 110 may be disposed to be adjacent to the quantum dot films 1400 disposed in the first region 301.

When the light unit 100 is disposed to be adjacent to the first region 301, the light emitting efficiency of the display device 1 may increase. When the quantum dot films 1400 are disposed in the second region 303, the quantum dot films 1400 may be disposed to be distant from the light source 110. Accordingly, it may be difficult for the quantum dot films 1400 to receive light emitted from the light source 110. The quantum dot films 1400 are unable to generate a sufficient amount of modulated light. Conversely, when the quantum dot films 1400 are disposed to be adjacent to the first region 301, the quantum dot films 1400 may be disposed to be close to the light source 110. Accordingly, the quantum dot films 1400 may receive more light from the light source 110 and generate a sufficient amount of modulated light. As a result, the light emitting efficiency of the display device 1 may increase.

The quantum dot films 1400 may be disposed to have different quantum dot concentrations for each region of the reflective plate 300. The quantum dot concentrations may include a first concentration and a second concentration. The quantum dot films 1400 may be disposed to have the first concentration in the first region and disposed to have the second concentration in the second region while the first concentration is larger than the second concentration.

The quantum dot films 1400 may be disposed to have different thicknesses for each region of the reflective plate 300. The thicknesses may include a first thickness and a second thickness. The quantum dot films may be disposed to have the first thickness in the first region and disposed to have the second thickness in the second region while the first thickness is thicker than the second thickness.

Referring to FIG. 19, the quantum dot films 1400 may be disposed in shapes of a plurality of dots on a reflective plate 1300.

The quantum dot films 1400 may include a first quantum dot film 1401, a second quantum dot film 1402, a third quantum dot film 1403, and a fourth quantum dot film 1404.

The first to fourth quantum dot films may be disposed on an upper surface of the reflective plate 1300 in shapes of dots. The first to fourth quantum dot films may be disposed on the upper surface of the first base film in shapes of dots.

The quantum dot films 1400 disposed in the shapes of dots may have predetermined sizes.

The sizes of the quantum dot films 1400 may be different from each other. The sizes of the first to fourth quantum dot films may be different from each other. Radii of dots of the first to fourth quantum dot films may be different from each other.

In this case, the sizes of the quantum dot films 1400 may be different for each region of the reflective plate. The sizes may include a first size and a second size. The quantum dot films 1400 may have the first size in the first region and have the second size in the second region while the first size is larger than the second size.

Alternatively, the sizes of the quantum dot films 1400 may be the same. The sizes of the first to fourth quantum dot films may be the same. Radii of the first to fourth quantum dot films may be the same.

The quantum dot films 1400 may be disposed so that predetermined gaps exist between the quantum dot films 1400. The gaps between the quantum dot films 1400 may include transverse gaps and longitudinal gaps. The transverse gaps may be defined as gaps between the quantum dot films 1400 adjacent in the first direction, and the longitudinal gaps may be defined as gaps between the quantum dot films 1400 in a direction perpendicular to the first direction. The transverse gaps may include a first transverse gap W1 and a second transverse gap W2, and the longitudinal gaps may include a first longitudinal gap H1 and a second longitudinal gap H2.

The gaps between the quantum dot films 1400 may be different from each other. The gaps between the first quantum dot film 1401 to the fourth quantum dot film 1404 may be different from each other. The first transverse gap W1 and the second transverse gap W2 may be different, and the first longitudinal gap H1 and the second longitudinal gap H2 may be different.

In this case, arrangement densities of the quantum dot films 1400 may be different for each region of the reflective plate on the basis of the different gaps. The arrangement densities may include a first density and a second density. The quantum dot films 1400 may have the first density in the first region and have the second density in the second region while the first density is greater than the second density. The quantum dot films may be arranged with a first gap in the first region and be arranged with a second gap in the second region while the first gap is smaller than the second gap.

The gaps between the quantum dot films 1400 may be the same. The gaps between the first quantum dot film 1401 to the fourth quantum dot film 1404 may be the same. The first transverse gap W1 and the second transverse gap W2 may be the same, and the first longitudinal gap H1 and the second longitudinal gap H2 may be the same.

The quantum dot films 1400 may be disposed for each region of the reflective plate. The quantum dot films 1400 may be disposed only in the first region.

The directions of the gaps are merely examples, and embodiments are not limited thereto. That is, although the directions of the transverse gaps and the longitudinal gaps have been described above as being perpendicular to each other, the directions of the transverse gaps and the longitudinal gaps may form a predetermined acute angle or obtuse angle.

Fourth Embodiment

Hereinafter, a fourth embodiment, which is a modified example of the first to third embodiments, will be described. Overlapping description among the first to third embodiments and the fourth embodiment will be omitted. In the description below, unless particularly described otherwise, the above-described first to third embodiments may be applied to the fourth embodiment.

Figure 20:
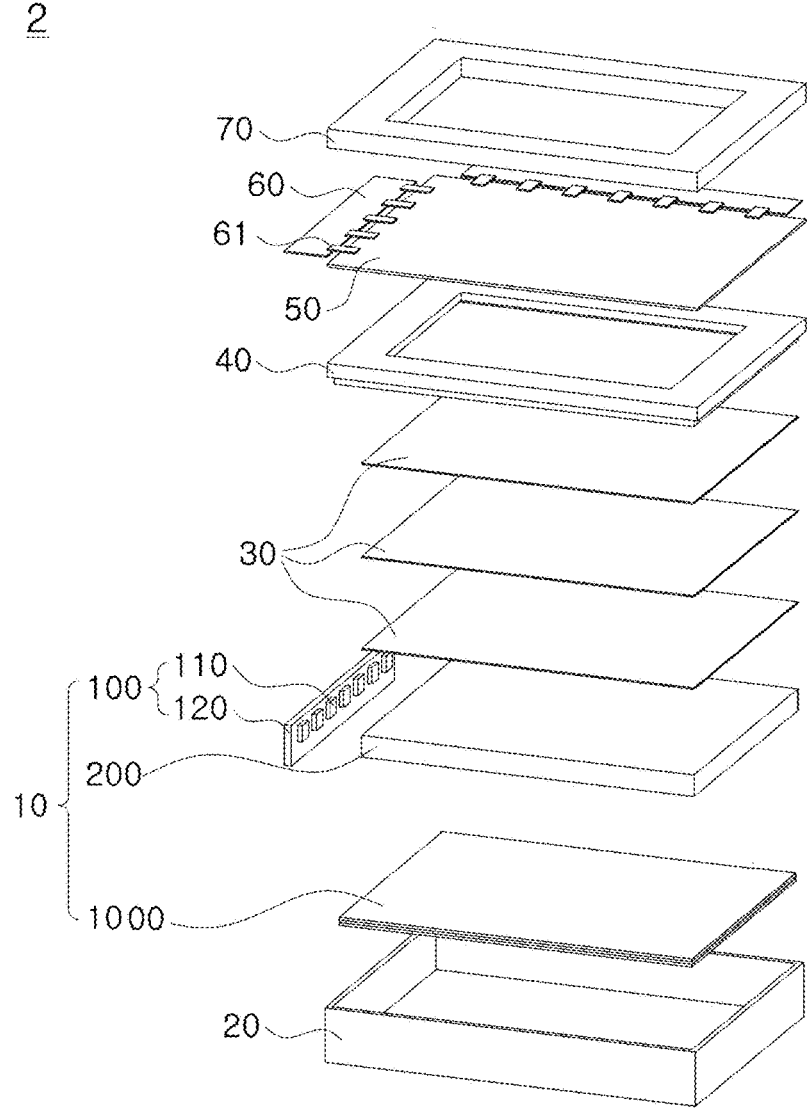
FIG. 20 is a view illustrating a display device according to an embodiment of the present application.

FIG. 20 is a view illustrating a display device 2 according to an embodiment of the present application.

Figure 21:
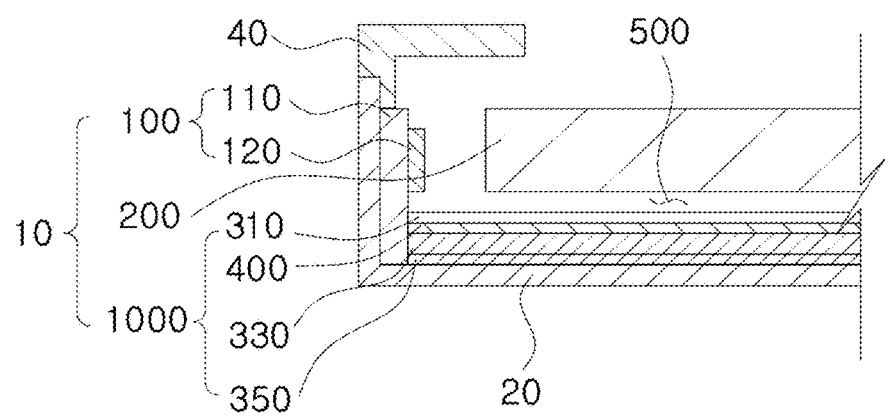
FIG. 21 is a side view illustrating the backlight unit, the support main body, and the bottom cover according to an embodiment of the present application.

FIG. 21 is a side view illustrating the backlight unit 10, the bottom cover 20, and the support main body 40 according to an embodiment of the present application.

Figure 22:
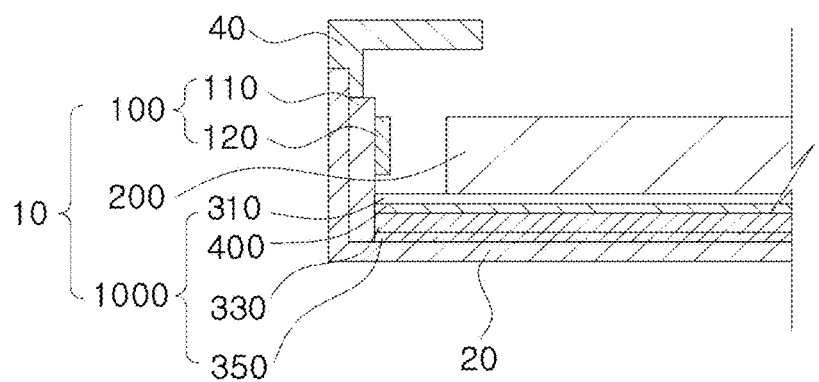
FIG. 22 is a side view illustrating the backlight unit, the support main body, and the bottom cover according to an embodiment of the present application.

FIG. 22 is a side view illustrating the backlight unit 10, the bottom cover 20, and the support main body 40 according to an embodiment of the present application.

Referring to FIG. 20, the display device 2 may include the backlight unit 10, the bottom cover 20, the optical sheets 30, the support main body 40, the display panel 50, the printed substrate 60, the FPC 61, and the top cover 70, and the backlight unit 10 may include the light unit 100, the light guide plate 200, and a light-modulating reflective film 1000.

The light-modulating reflective film 1000 may be disposed between the light guide plate 200 and the bottom cover 20.

The light-modulating reflective film 1000 may modulate light incident thereon and output modulated light. The modulated light may be defined as light having different optical characteristics from the light incident on the light-modulating reflective film. The optical characteristics may include intensity of light for each wavelength and path of light. The modulated light may be white light.

Predetermined light may be incident on the light-modulating reflective film 1000, and modulated light may be output from the light-modulating reflective film 1000.

Hereinafter, the light-modulating reflective film 1000 will be described with reference to FIGS. 21 and 22.

First, elements of the light-modulating reflective film 1000 will be described.

The light-modulating reflective film 1000 may include the first base film 310, the quantum dot film 400, the reflective film 330, and the second base film 350.

The first base film 310 may be disposed between the light guide plate 200 and the quantum dot film 400.

The quantum dot film 400 may be disposed between the first base film 310 and the reflective film 330.

The second base film 350 may be disposed below the reflective film 330.

The elements may be integrally formed.

As the light-modulating reflective film 1000 is disposed in the display device 2, a process of manufacturing the display device 2 may be simplified. The reflective film 330 and the quantum dot film 400 may be separately disposed in the display device 2. In this case, a process of separately producing each of the layers and a process of separately arranging each of the layers in the display device 2 should be performed to manufacture the display device 2. Conversely, the light-modulating reflective film 1000 in which the reflective film 330 and the quantum dot film 400 are integrally formed may be disposed in the display device 2. In this case, because a process of separately arranging each of the layers in the display device 2 is not required, the process of manufacturing the display device 2 may be simplified.

Hereinafter, each of the elements of the light-modulating reflective film 1000 will be described in detail.

The first base film 310 and the second base film 350 may maintain an outer shape of the light-modulating reflective film 1000. The first base film 310 and the second base film 350 may allow arrangement states of the quantum dot film 400 and the reflective film 330 which are disposed between the first base film 310 and the second base film 350 to be maintained.

The first base film 310 may prevent damage to the quantum dot film 400 due to a predetermined external force.

The first base film 310 may be formed of a predetermined material. The material may be a PET-based material.

The first base film 310 may be disposed to be in contact with a top of the quantum dot film 400. A lower surface of the first base 310 may be in contact with the upper surface of the quantum dot film 400.

The first base film 310 may be in contact with each of the elements of the quantum dot film 400. The first base film 310 may be in contact with at least one of the organic members 410, the inorganic members 430, the quantum dots 450, the chain molecules 470, or the beads 490 of the quantum dot film 400.

When the first base film 310 is disposed, the process of manufacturing the display device 2 of the present application may be simplified. In the case of a conventional quantum dot film, thermal stability and phase stability are considerably low. Color stability, color reproducibility, efficiency, and the like of a display device including the conventional quantum dot film decrease over time. To prevent this, a barrier film implemented using an organic-inorganic composite material such as $Al_2O_3$, $SiO_x$, and SiNx (x is 1 to 3) is disposed at a top of the quantum dot film. The barrier film is formed according to a predetermined deposition process. Conversely, the quantum dot film 400 of the present application has high thermal stability and phase stability compared to the conventional quantum dot film. Consequently, the display device 2 can maintain high color stability, color reproducibility, light efficiency, and the like even when the barrier film is not disposed at the top of the quantum dot film 400. The quantum dot film 400 only has the first base film 310 disposed thereabove to prevent scratches of the quantum dot film 400. The first base film 310 may be formed by a roll-to-roll process which is simpler than the deposition process. As a result, the process of manufacturing the display device 2 of the present application may be simplified.

Hereinafter, the quantum dot film 400 will be described.

The top of the quantum dot film 400 may be in contact with the first base film 310, and the bottom thereof may be in contact with the reflective film 330. The quantum dot film 400 may be disposed to be in contact with a top of the reflective film 330.

Each of the elements of the quantum dot film 400 may be in contact with the lower surface of the reflective film 330. At least one of the organic members 410, the inorganic members 430, the quantum dots 450, the chain molecules 470, and the beads 490 of the quantum dot film 400 may be in contact with the lower surface of the reflective film 330.

Hereinafter, a positional relationship between the first base film 310 and the light guide plate 200 will be described.

As illustrated in FIG. 21, the first base film 310 may be disposed below the light guide plate 200 to be spaced apart from the light guide plate 200. The predetermined air gap 500 may be formed between the first bases film 310 and the light guide plate 200. The upper surface of the first base film 310 may be exposed to the air gap 500.

Alternatively, as illustrated in FIG. 22, the first base film 310 may be disposed below the light guide plate 200 to be in contact with the light guide plate 200. The first base film 310 may be in contact with a lower surface of the light guide plate 200. The upper surface of the first base film 310 may be in contact with the bottom of the light guide plate 200.

Hereinafter, a light output and a light application of each of the elements of the backlight unit 10 that includes the light-modulating reflective film 1000 will be described. The light output is defined as an output of light from each of the elements. The light application is defined as an application of light to each of the elements.

Figure 23:
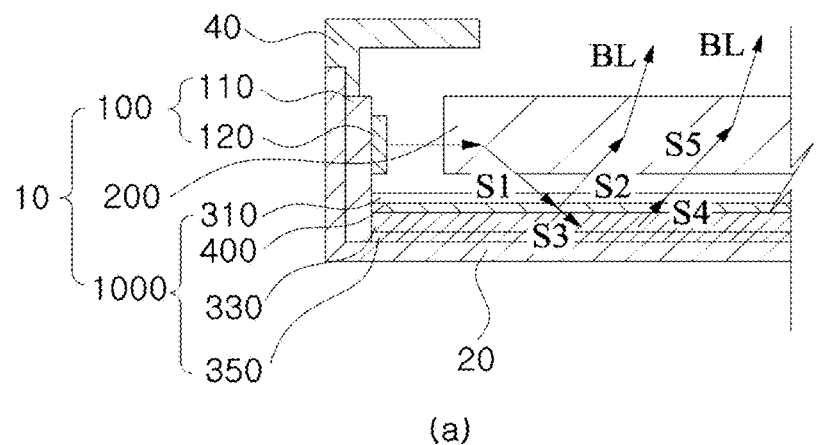
FIG. 23 is a view illustrating a light output of the backlight unit according to an embodiment of the present application.
Figure 23:
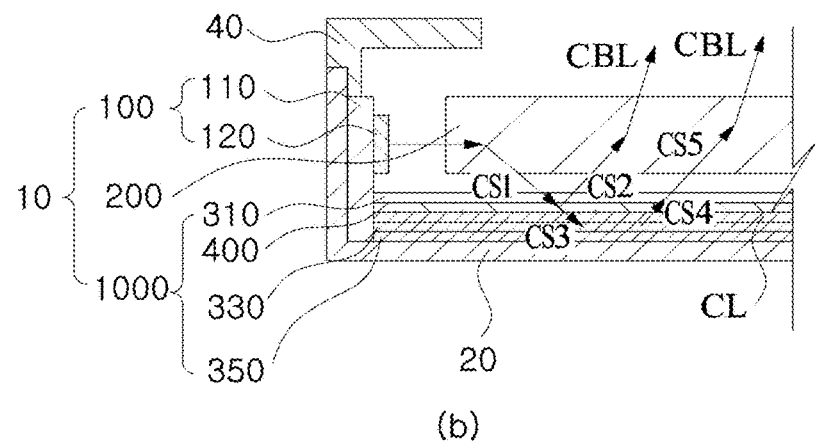

FIG. 23 is a view illustrating a light output of the backlight unit 10 including the light-modulating reflective film 1000 according to an embodiment of the present application.

Hereinafter, description will be given with reference to FIG. 23.

Referring to FIG. 23(a), the light source 110 may output predetermined light.

The light output from the light source 110 may be dispersed by the light guide plate 200 and output downward. The light output downward may be applied to at least one of the first base film 310, the quantum dot film 400, and the reflective film 330.

Light may be output upward from each of the elements of the backlight unit 10. Light may be output upward from the first base film 310 and the quantum dot film 400.

The light output upward from each of the elements of the backlight unit 10 may include first to fifth rays of light. Light output from the light guide plate 200 and applied to the quantum dot film 400 may be defined as a first light S1, light output from the quantum dot film 400 and applied to the light guide plate 200 may be defined as a second light S2, light output from the quantum dot film 400 and applied to the reflective film 330 may be defined as a third light S3, light output from the reflective film 330 and applied to the first base film 310 may be defined as a fourth light S4, and light output from the first base film 310 and applied to the light guide plate 200 may be defined as a fifth light S5.

The first light S1 may transmit through the first base film 310 and be applied to the quantum dot film 400. The second light S2 may transmit through the first base film 310 and be applied to the light guide plate 200. The third light S3 may be output from the quantum dot film 400 and directly applied to the reflective film 330. The fourth light S4 may be output from the reflective film 330, transmit through the quantum dot film 400, and be applied to the first base film 310. The fifth light S5 may be output from the first base film 310 and applied to the light guide plate 200.

Backlight BL may be output upward from the light guide plate 200.

Referring to FIG. 23(b), a predetermined layer CL may be disposed between the quantum dot film 400 and the reflective film 330. The predetermined layer CL may be a barrier film or a base film. The material of the barrier film may be an organic-inorganic composite material such as $Al_2O_3$, SiOx, and SiNx (x is 1 to 3).

In this case, because light is output from each of the elements of the backlight unit 10 and applied to each of the elements as in the above-described case in which the quantum dot film 400 and the reflective film 330 are in contact with each other, overlapping description of the first to fifth rays of light will be omitted.

In this case, a third light CS3 may transmit through the predetermined layer CL and be applied to the reflective film 330, and a fourth light CS4 may transmit through the predetermined layer CL and be applied to the first base film 310.

Backlight CBL may be output upward from the light guide plate 200.

According to the fourth embodiment of the present application, when the quantum dot film 400 and the reflective film 330 are disposed to be in contact with each other, light intensity of the backlight unit 10 may be improved.

In the backlight unit 10, the improvement in the light intensity may be due to the first base film 310 disposed above the quantum dot film 400. Referring to FIG. 23(a), when the barrier film is disposed above the quantum dot film 400, the intensity of the backlight BL may considerably decrease due to the barrier film. The intensity of the first light S1 applied to the quantum dot film 400 may decrease due to the barrier film. The intensity of the second light S2 output from the quantum dot film 400 may decrease on the basis of the first light S1 having the decreased intensity. The intensity of the second light S2 may decrease due to the barrier film, and the second light S2 may be transmitted to the light guide plate 200. The decrease in the intensity may be due to the organic-inorganic composite material such as $Al_2O_3$, SiOx, and SiNx (x is 1 to 3) included in the barrier film. The backlight BL output from the light guide plate 200 may have a first intensity. Conversely, when the first base film 310 is disposed above the quantum dot film 400, a considerable decrease in the intensity of the first light S1 may be prevented by the first base film 310. The intensity of the first light S1 may be maintained. On the basis of the first light S1, the intensity of the second light S2 output from the quantum dot film 400 may not considerably decrease. The intensity of the second light S2 may be maintained. A considerable decrease in the intensity of the second light S2 may be prevented by the first base film 310, and the second light S2 may be transmitted to the light guide plate 200. In this case, the backlight BL output from the light guide plate 200 may have a second intensity. Here, the second intensity may be higher than the first intensity. As a result, by the first base film 310 disposed above the quantum dot film 400, the intensity of the backlight emitted from the backlight unit 10 may be improved.

Alternatively, the improvement in the light intensity may be improved due to the quantum dot film 400 and the reflective film 330 being in contact with each other. Referring to FIGS. 23(a) and 23(b), when the predetermined layer CL is formed between the quantum dot film 400 and the reflective film 330, the intensity of the light transmitted from the reflective film 330 to the light guide plate 200 may considerably decrease. When the predetermined layer CL is formed, the intensity of the third light CS3 may be decreased due to the predetermined layer CL, and the third light CS3 may be transmitted to the reflective film 330. The reflective film 330 may output the fourth light CS4 with decreased intensity on the basis of the third light CS3 with the decreased intensity. The fourth light CS4 having the intensity decreased due to the predetermined layer CL may be transmitted to the first base film 310. The first base film 310 may output a fifth light CS5 with decreased intensity on the basis of the fourth light CS4. In this case, the light guide plate 200 may receive the fifth light CS5 and output the backlight CBL having the first intensity.

Conversely, the quantum dot film 400 may be formed to be in contact with the reflective film 330. In this case, the intensity of the third light S3 may not be influenced by the predetermined layer CL, and the third light CS3 may be transmitted to the reflective film 330. The reflective film 330 may output the fourth light S4 with almost unchanged intensity on the basis of the third light S3. The first base film 310 may output the fifth light S5 with unchanged intensity on the basis of the fourth light S4. The light guide plate 200 may receive the fifth light S5 and output the backlight BL having the second intensity. The second intensity may be higher than the first intensity. As a result, by the quantum dot film 400 and the reflective film 330 being in contact with each other, the intensity of the backlight emitted from the backlight unit 10 may be improved.

Although light transmission has been described using a case in which the light guide plate 200 and the first base film 310 are spaced apart from each other as an example, embodiments are not limited thereto, and the light transmission may also be applied to a case in which the light guide plate 200 and the first base film 310 are in contact with each other.

Fifth Embodiment

Hereinafter, a fifth embodiment, which is a modified example of the first to fourth embodiments, will be described. Overlapping description among the first to fourth embodiments and the fifth embodiment will be omitted. In the description below, unless particularly described otherwise, the above-described first to fourth embodiments may be applied to the fifth embodiment.

Figure 24:
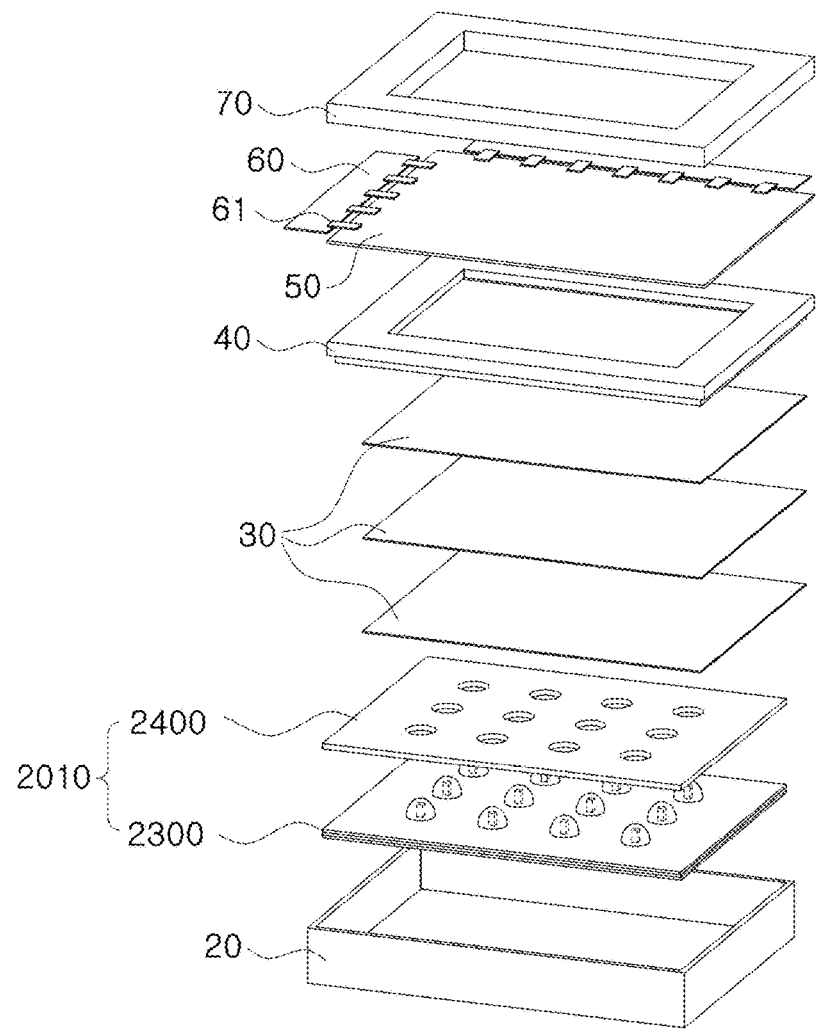
FIG. 24 is a view illustrating a direct type display device according to an embodiment of the present application.

FIG. 24 is a view illustrating a direct type display device 3 according to an embodiment of the present application.

Figure 25:
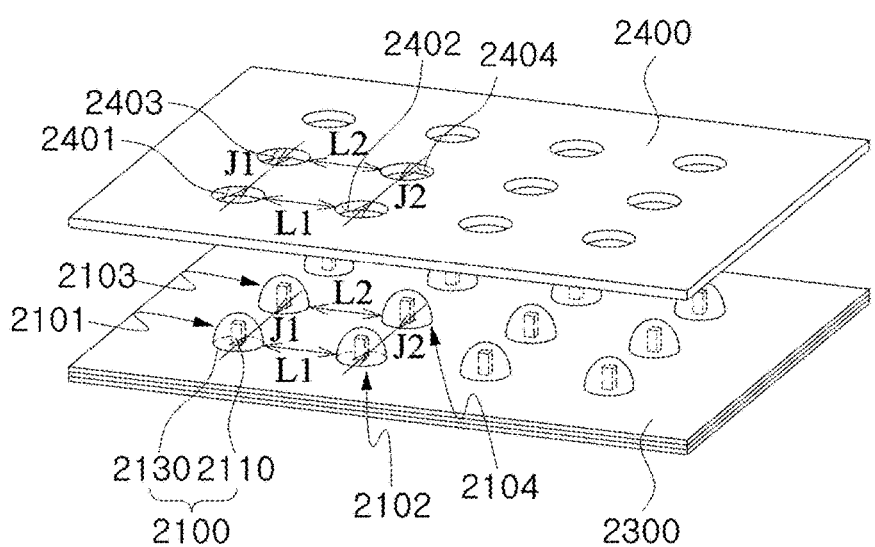
FIG. 25 is a view illustrating a light unit, a reflective plate, and a quantum dot film according to an embodiment of the present application.

FIG. 25 is a view illustrating light units 2100, a reflective plate 2300, and quantum dot films 2400 according to an embodiment of the present application.

Referring to FIGS. 24 and 25, the direct type display device 3 may include a direct type backlight unit 2010, the bottom cover 20, the optical sheets 30, the support main body 40, the display panel 50, the printed substrate 60, the FPC 61, and the top cover 70, the direct type backlight unit 2010 may include the light units 2100, the quantum dot films 2400, and the reflective plate 2300, and the light units 2100 may each include a light source 2110 and a lens 2130. However, elements illustrated in FIGS. 24 and 25 are not essential, and a display device having more or less elements than those illustrated in FIGS. 24 and 25 may be implemented. For example, the direct type display device 3 may also include the light guide plate 200.

Hereinafter, each of the elements of the direct type backlight unit 2010 will be described.

Referring to FIG. 25, the light units 2100 may be disposed on the reflective plate 2300.

The lens 2130 may be disposed to cover the light source 2110. The lens 2130 may diffuse light output from the light source 2110 and transmit the light to another element. By the lens 2130, a transmission rate of the light to each of the elements may be improved.

A predetermined gap between the plurality of light units 2100 disposed on the reflective plate 2300 may be set. The light units 2100 may include first to fourth light units 2100. A first light unit 2101 and a second light unit 2102 may have a first light transverse gap L1, and a third light unit 2103 and a fourth light unit 2104 may have a second light transverse gap L2. The first light unit 2101 and the third light unit 2103 may have a first light longitudinal gap J1, and the second light unit 2102 and the fourth light unit may have a second light longitudinal gap J2.

The gaps between the light units 2100 may be different from each other. The gaps between the first to fourth light units may be different from each other. The first light transverse gap L1 and the second light transverse gap L2 may be different, and the first light longitudinal gap J1 and the second light longitudinal gap J2 may be different.

Alternatively, the gaps between the light units 2100 may be the same. The gaps between the first to fourth light units may be the same. The first light transverse gap L1 and the second light transverse gap L2 may be the same, and the first light longitudinal gap J1 and the second light longitudinal gap J2 may be the same.

Predetermined holes may be formed in the quantum dot films 2400. The holes may pass through upper surfaces and lower surfaces of the quantum dot films 2400.

The holes may be formed at positions corresponding to those of the light units 2100. The holes may be formed so that the light units 2100 may be exposed toward the light guide plate.

The plurality of holes may have predetermined gaps between each other. The holes may include a first hole 2401 to a fourth hole 2404. The gaps between the first hole 2401 to the fourth hole 2404 may be different from each other while the gaps are set corresponding to the gaps between the light units 2100. The first hole 2401 and a second hole 2402 may have the first light transverse gap L1, and a third hole 2403 and the fourth hole 2404 may have the second light transverse gap L2. The first hole 2401 and the third hole 2403 may have the first light longitudinal gap J1, and the second hole 2402 and the fourth hole 2404 may have the second light longitudinal gap J2.

The gaps between the holes may be different from each other. The gaps between the first to fourth holes may be different from each other. The first light transverse gap L1 and the second light transverse gap L2 may be different, and the first light longitudinal gap J1 and the second light longitudinal gap J2 may be different.

Alternatively, the gaps between the holes may be the same. The gaps between the first to fourth holes may be the same. The first light transverse gap L1 and the second light transverse gap L2 may be the same, and the first light longitudinal gap J1 and the second light longitudinal gap J2 may be the same.

Figure 26:
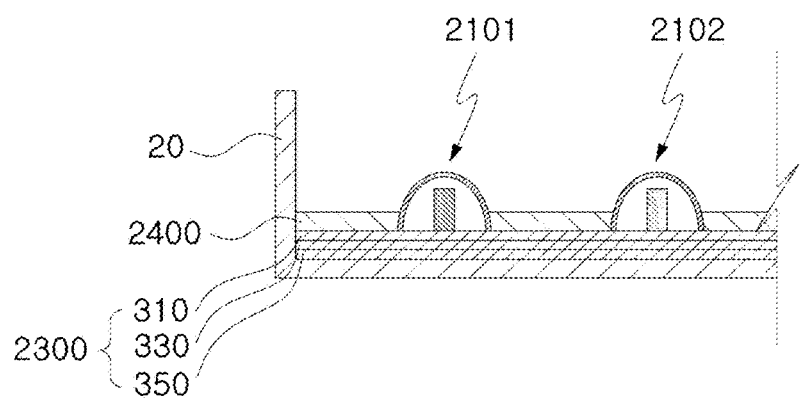
FIG. 26 is a side view illustrating a direct type backlight unit, a support main body, and a bottom cover according to an embodiment of the present application.

FIG. 26 is a side view illustrating the direct type backlight unit 2010, the support main body, and the bottom cover according to an embodiment of the present application.

The quantum dot films 2400 may include a first quantum dot film 2405 and a second quantum dot film 2406.

The light units 2100 may be disposed between adjacent quantum dot films 2400. The first light unit 2101 may be disposed between the first quantum dot film 2405 and the second quantum dot film 2406.

The light units 2100 may be in contact with the quantum dot film 2400 adjacent thereto and the reflective plate 2300. The first light unit 2101 may be in contact with the first quantum dot film 2405 and the second quantum dot film 2406, and the second light unit 2102 may be in contact with the second quantum dot film 2406. The lens 2130 of the first light unit 2101 may be in contact with the first quantum dot film 2405, the second quantum dot film 2406, and the first base film 310 of the reflective plate 2300. The lens 2130 of the second light unit 2102 may be in contact with the second quantum dot film 2406 and the first base film 310 of the reflective plate 2300.

Sixth Embodiment

Hereinafter, a sixth embodiment, which is a modified example of the first to fifth embodiments, will be described. Overlapping description among the first to fifth embodiments and the sixth embodiment will be omitted. In the description below, unless particularly described otherwise, the above-described first to fifth embodiments may be applied to the sixth embodiment.

Figure 27:
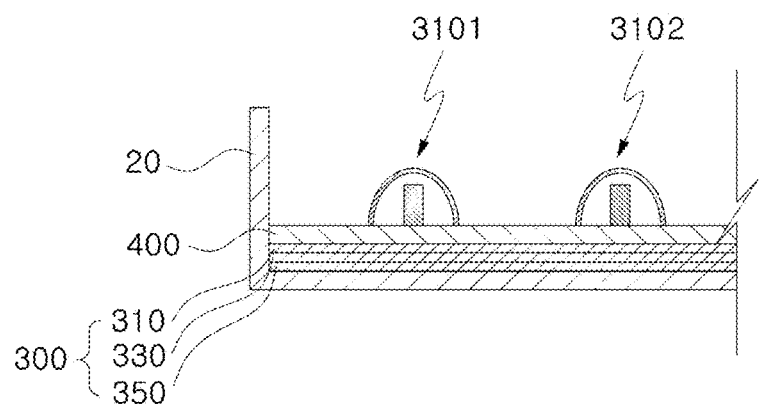
FIG. 27 is a side view illustrating the direct type backlight unit, the support main body, and the bottom cover according to an embodiment of the present application.

FIG. 27 is a side view illustrating the direct type backlight unit 2010, the support main body 40, and the bottom cover 20 according to an embodiment of the present application.

The quantum dot film 400 may be disposed on the reflective plate 300.

Light units 3100 may be disposed on the quantum dot film 400. The light units may include a first light unit 3101 and a second light unit 3102. The light sources 2110 and the lenses 2130 of the light units 3100 may be disposed on the quantum dot films 400. The light sources 2110 of the light units 3100 may be in contact with the quantum dot film 400.

The above-described direct type display device 3 may have improved light emitting efficiency. Because the quantum dot film 400 can directly receive light from the light source 2110, an amount of modulated light emitted from the quantum dot film 400 may increase.

According to the present application, a backlight unit that is easy to be disposed in a display device can be provided.

According to the present application, a backlight unit that includes a quantum dot film with improved phase stability and thermal stability can be provided.

The advantageous effects of the present application are not limited to the above-described advantageous effects, and other unmentioned advantageous effects should be clearly understood by one of ordinary skill in the art to which the present application pertains from the present specification and the accompanying drawings.

In the above-described backlight unit and display device including the same according to the present application, the steps constituting each of the embodiments are not essential, and thus, each of the embodiments may selectively include the above-described steps. Also, the steps constituting each of the embodiments are not necessarily performed according to the above-described orders, and a step described later may also be performed before a step described earlier. Further, any one step may be repeatedly performed while the steps are performed.

Although the elements and the features of the present disclosure have been described above on the basis of the embodiments according to the present disclosure, the present disclosure is not limited thereto. One of ordinary skill in the art to which the present disclosure pertains should clearly understand that the present disclosure may be changed or modified in various ways within the idea and the scope of the present disclosure, and it should be noted that such changes or modifications belong to the scope of the attached claims.

What is claimed is:

1. A backlight unit, comprising,
a light source;
a light guide plate disposed at a side portion of the light source; and
a light-modulating reflective film disposed below the light guide plate;
wherein the light-modulating reflective film includes a first base film, a quantum dot film disposed so as to be in contact with a bottom of the first base film and including at least one quantum dot, a reflective film including a diffuse reflection material, and a second base film disposed so as to be in contact with a bottom of the reflective film,
wherein the reflective film including diffuse reflection material is disposed so as to be in contact with the quantum dot film,
wherein the quantum dot film includes a quantum dot powder,
wherein the quantum dot powder includes a first quantum dot, a second quantum dot, a first chain molecule, a second chain molecule, and a bead,
wherein the first quantum dot and the second quantum dot are disposed at positions adjacent to each other,
wherein a first end of the first chain molecule is attached to the first quantum dot, a first end of the second chain molecule is attached to the second quantum dot, and
wherein the bead is located between a second end of the first chain molecule and a second end of the second chain molecule.

2. The backlight unit as in claim 1,
wherein the first base film and the second base film include Polyethylene terephthalate(PET).

3. The backlight unit as in claim 2,
wherein between the first base film and the light guide plate an air gap is formed, and an upper surface of the first base film is exposed to the air gap.

4. The backlight unit as in claim 2,
wherein the upper surface of the first base film is in contact with the lower surface of the light guide plate, and
a lower surface of the first base film is contact with the quantum dot film.

5. The backlight unit as in claim 2,
wherein a light output from the light source is applied to the light guide plate,
wherein a first light which is applied to the quantum dot film through the first base film is output from the light guide plate, and
wherein a second light which is transmitted through the first base film is output from the quantum dot film in direction toward the light guide panel.

6. The backlight unit as in claim 5,
wherein a third light which is applied to the reflective film is output from the quantum dot film, and
a fourth light is output from the reflective film.

7. The backlight unit as in claim 6,
wherein a backlight is output from the light guide panel on the basis of the fourth light.

8. The backlight unit as in claim 7,
wherein the quantum dot film includes an organic member, an inorganic member place in contact with the organic member, and the quantum dot powder adjacent to the inorganic member,
wherein each of the first quantum dot and the second quantum dot includes a quantum core, a quantum shell surrounding the quantum core, and a ligand formed on a surface of the quantum shell, and
wherein the inorganic member is in contact with at least one of the first chain molecule and the second chain molecule.

9. The backlight unit as in claim 8,
wherein the organic member includes a first organic member and a second organic member, and the inorganic member includes a first inorganic member and a second inorganic member, and
wherein an organic functional group of the first organic member is in contact with the first inorganic member, an organic functional group of the second organic member is contact with the second inorganic member, and the first inorganic member is in contact with the first chain molecule and the second inorganic member is in contact with the first chain molecule.

10. The backlight unit as in claim 9,
wherein at least one of the organic member, the inorganic member, the quantum dot, the first chain molecule, the second chain molecule, and the bead is in contact with the reflective film.

11. A display device, comprising,
a bottom cover;
a support main body coupled to the bottom cover; and
a backlight unit disposed between the bottom cover and the support main body;
  wherein the backlight unit includes a light source, a light guide plate disposed at a side portion of the light source, and a light-modulating reflective film disposed below the light guide plate and including a quantum dot, wherein the light-modulating reflective film includes a first base film, a quantum dot film disposed so as to contact a bottom of the first base film and including quantum dot, reflective film including diffuse reflection material, and a second base film disposed so as to contact a bottom of the reflective film, and the reflective film including diffuse reflection material is disposed so as to contact the quantum dot film,
wherein the quantum dot film includes a quantum dot powder,
wherein the quantum dot powder includes a first quantum dot, a second quantum dot, a first chain molecule, a second chain molecule, and bead,
wherein the first quantum dot and the second quantum dot are disposed at positions adjacent to each other,
wherein a first end of the first chain molecule is attached to the first quantum dot, a first end of the second chain molecule is attached to the second quantum dot, and
wherein the bead is located between a second end of the first chain molecule and a second end of the second chain molecule.

* * * * *